US008099325B2

(12) United States Patent (10) Patent No.: US 8,099,325 B2
Gangadharpalli et al. (45) Date of Patent: Jan. 17, 2012

(54) SYSTEM AND METHOD FOR SELECTIVE TRANSMISSION OF MULTIMEDIA BASED ON SUBSCRIBER BEHAVIORAL MODEL

(75) Inventors: Sridhar Gangadharpalli, Bangalore (IN); Sridhar Varadarajan, Bangalore (IN); Korrapati Kaliana Rao, Bangalore (IN)

(73) Assignee: Saytam computer Services Limited, Secunderabad (IN)

( * ) Notice: Subject to any disclaimer, the term of this patent is extended or adjusted under 35 U.S.C. 154(b) by 2665 days.

(21) Appl. No.: 10/135,675

(22) Filed: May 1, 2002

(65) Prior Publication Data
US 2003/0208754 A1 Nov. 6, 2003

(51) Int. Cl.
*G06Q 30/00* (2006.01)
*G05B 19/418* (2006.01)
(52) U.S. Cl. ..................... 705/14.49; 725/34
(58) Field of Classification Search ............ 705/14; 707/706; 725/34
See application file for complete search history.

(56) References Cited

U.S. PATENT DOCUMENTS

| | | | |
|---|---|---|---|
| 5,247,575 A * | 9/1993 | Sprague et al. | 705/53 |
| 5,515,098 A | 5/1996 | Carles | |
| 5,794,210 A | 8/1998 | Goldhaber et al. | |
| 6,216,129 B1 | 4/2001 | Eldering | |
| 6,674,995 B1 * | 1/2004 | Meyers et al. | 455/41.2 |
| 7,630,986 B1 * | 12/2009 | Herz et al. | 707/10 |

OTHER PUBLICATIONS

Customer experience places. The new offering frontier. Gilmore, James. Strategy & Leadership. v30n4. pp. 4-11. 2002.*
"Furniture Retailer Heilig-Meyers Chooses Xchanges Inc' eCRM technology to manage over 1.2 million customer relationships". PR Newswire, p. 0293. Jun. 29, 2000.*
"Developing Personalized Services—The 'e-personality'", $m^2p$ technology overview, Mobile Media Technologies, pp. 1 and 2.
"CRM/Marketing Automation and Optimization", Predictive CRM Suite™, Mobile Telecommunications, pp. 1-3.

* cited by examiner

*Primary Examiner* — John Weiss
*Assistant Examiner* — Victoria Vanderhorst
(74) *Attorney, Agent, or Firm* — Merek, Blackmon & Voorhees, LLC

(57) ABSTRACT

An advertisement system that provides subscribers with the most relevant advertisements based on their individual purchase prediction of the various products and contextual information such as location, ongoing public events, festivals and personal events. The system customizes the advertisements to suit the audiovisual, language, and textual caption preferences of the subscribers. System provides for tracking of various promotional offers made to the subscribers from the time the offer is made to the time it is redeemed by the subscriber. System consists of methods to learn (a) purchase predictions (b) preferred streaming schedule and (c) the subscriber's preferences in terms of audiovisual aspects of the advertisements. Purchase prediction for individual subscriber is derived from historical purchase data by time series analysis and the influence of events such as co-purchases of other products and organized events such as sales exhibitions and festivals is derived based on Bayesian network models.

1 Claim, 29 Drawing Sheets

PPAS NETWORK ARCHITECTURE

PPAS SYSTEM ARCHITECTURE

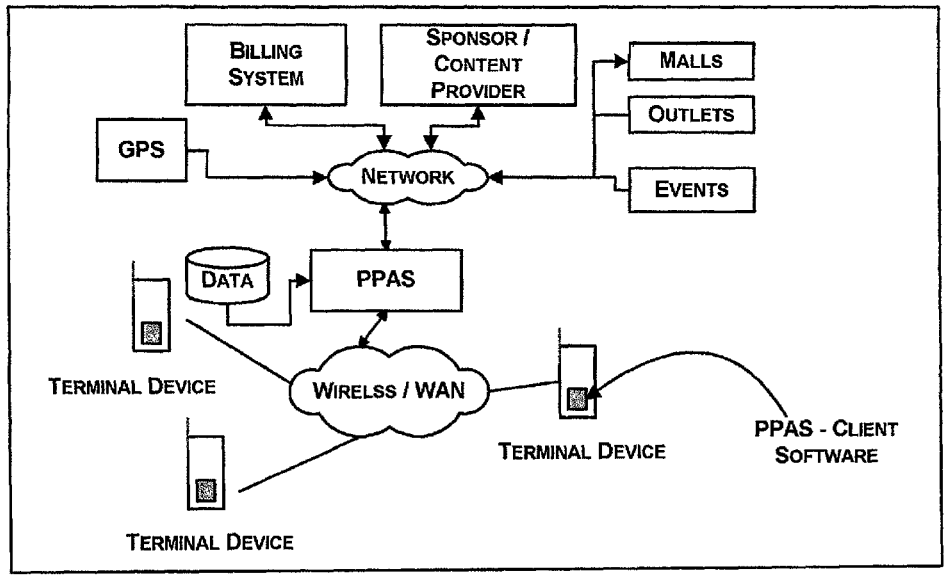
FIG-1A-1: PPAS NETWORK ARCHITECTURE
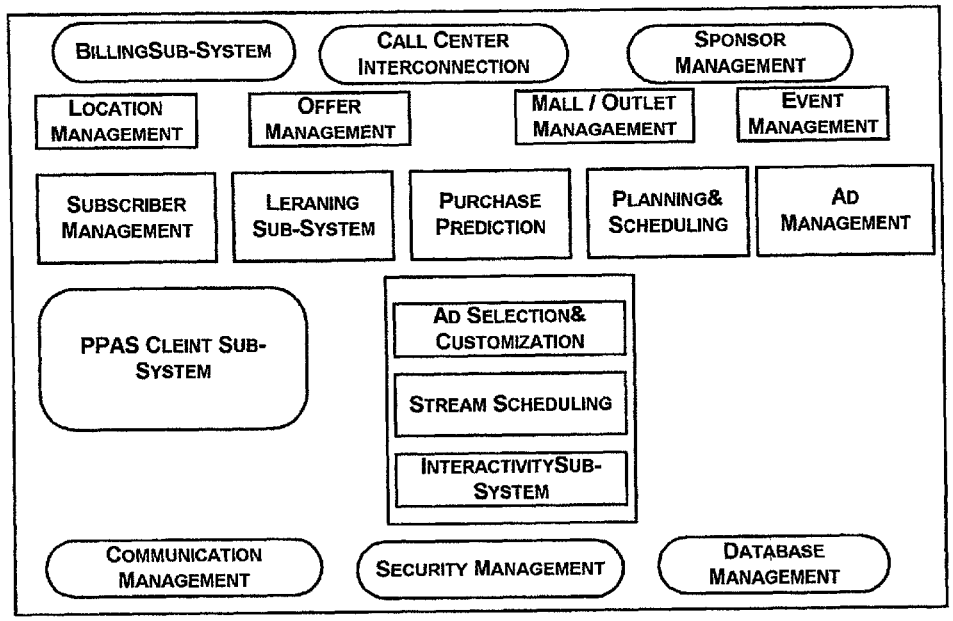
FIG-1A-2: PPAS SYSTEM ARCHITECTURE

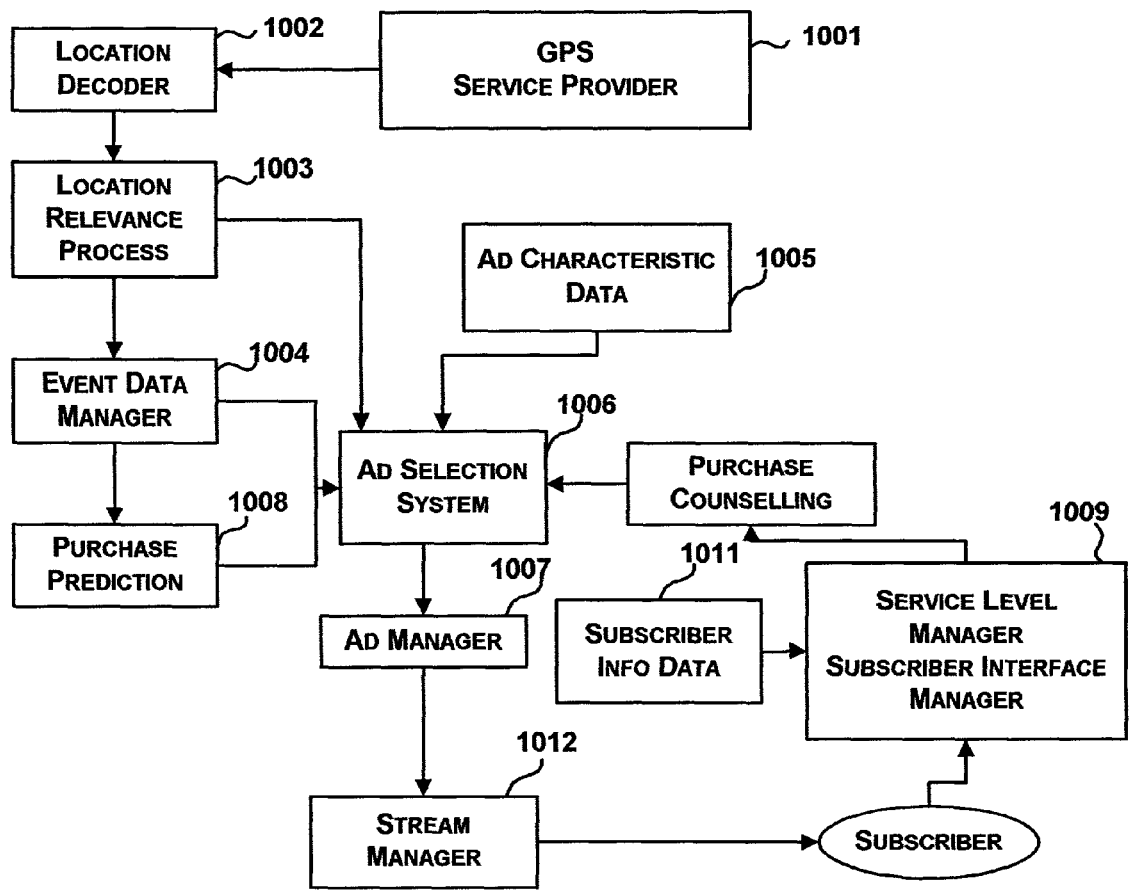
FIG-1B: SYSTEM-SUBSCRIBER IINTERFACES IN VARIOUS CONTEXTS

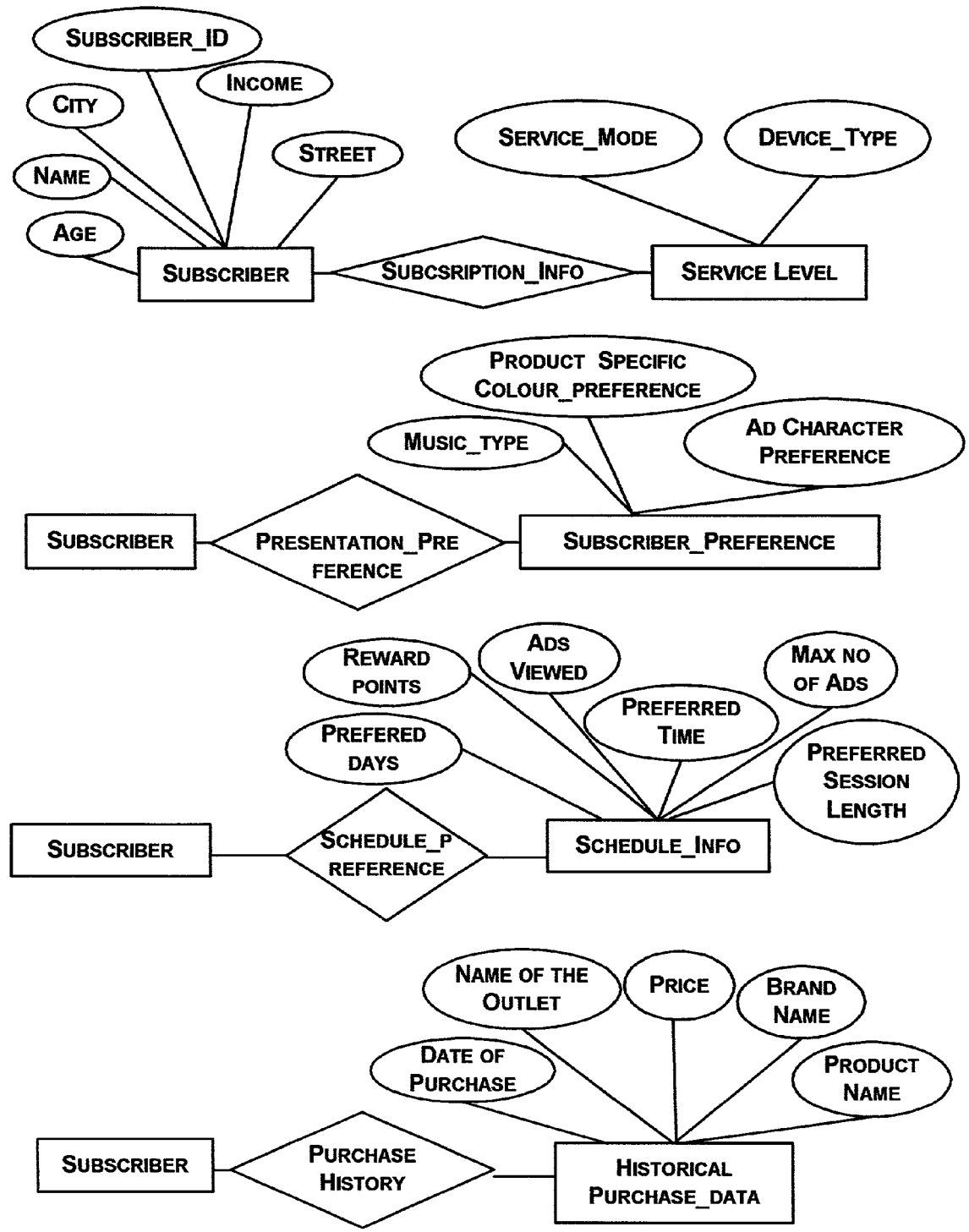
FIG-2A: SUBSCRIBER DATA-ENTITY RELATIONS

| SUBSCRIBER_ID = SU_ID | | | | |
|---|---|---|---|---|
| MAXIMUM NUMBER OF STREAMS = N | | | | |
| DAY | SESSION START TIME | SESSION END TIME | SESSION_NUMBER | PREFERRED DEVICE |
| MONDAY | 9:00 | 11:00 | 1 | |
| MONDAY | 14:00 | 16:00 | 2 | |
| TUESDAY | 9:00 | 11:00 | 3 | |
| WEDNESSDAY | 16:00 | 18:00 | 4 | |
| THURSDAY | 9:00 | 11:00 | 5 | |
| THURSDAY | 20:00 | 22:00 | 6 | |
| FRIDAY | 18:00 | 21:00 | 7 | |
| SATURADY | 9:00 | 11:00 | 8 | |

2002

FIG-2B-1: TYPICAL FORMAT FOR THE INPUT OF SUBSCRIBER SPECIFIED SCHEDULE FOR STREAMING

| 1 | MUSIC TYPE | |
|---|---|---|
| | MUSIC TYPE | SUBSCRIBER PREFERENCE RATING |
| | ROCK | |
| | LIGHT CLASSICAL | |
| | INSTRUMENTAL | |
| | | |
| 2 | COLOR PREFERENCES | |
| | PRODUCT NAME | PREFERRED COLOR |
| | SHOES | BLACK |
| | SHIRT | LIGHT SHADES |
| | | |
| 3 | SCENE BACKGROUND | |
| | TYPE | RATING |
| | BLUE SKY | |
| | GREEN PASTURES | |
| 4 | AD CHARACTER PREFERENCES | |
| | TYPE | RATING |

2003

FIG-2B-2: FORMAT FOR THE INPUT OF SUBSCRIBER'S PREFERENCES OF THE PRESENTATION ASPECTS

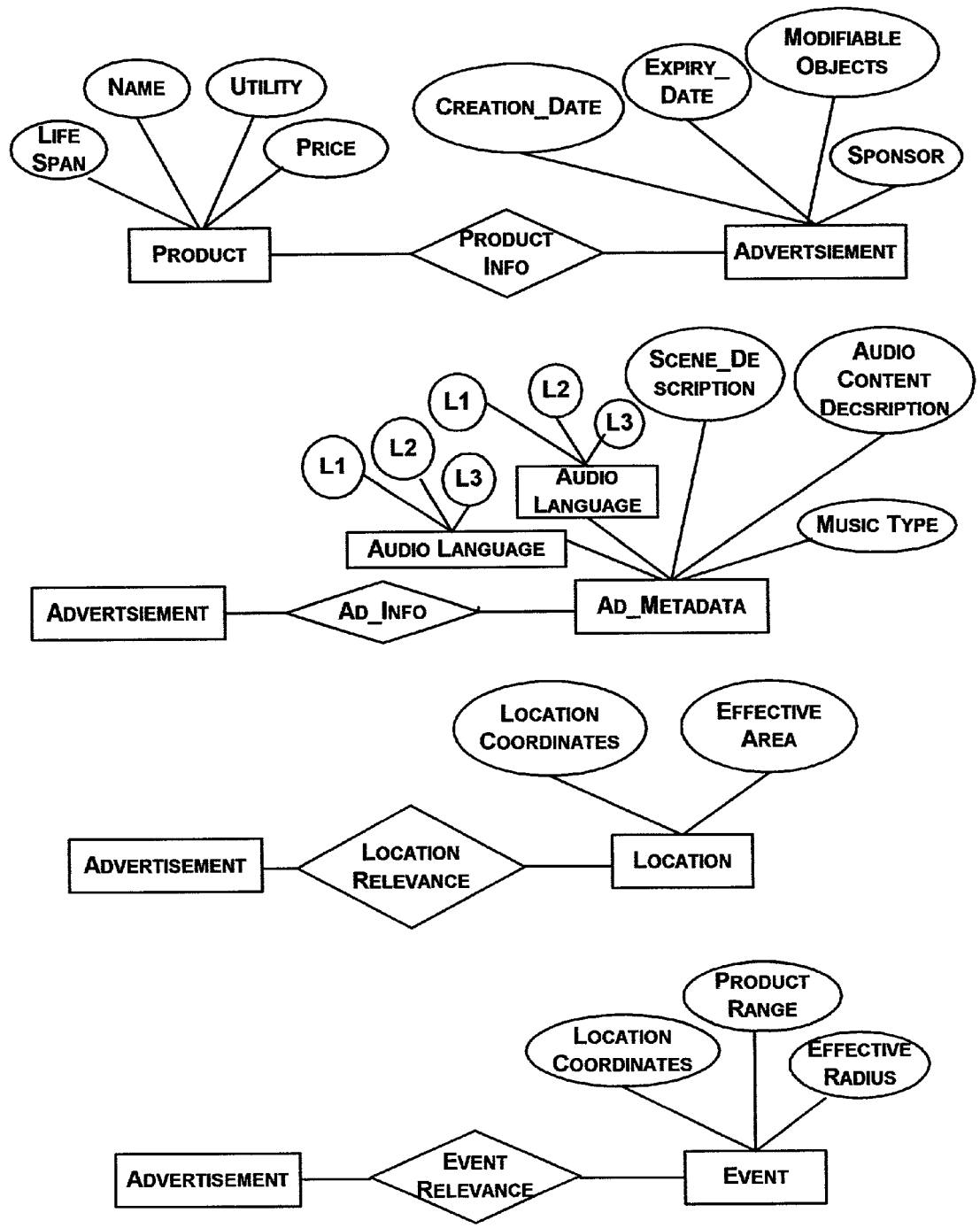
FIG-2C: AD CHARACTERISTICS DATA-ENTITY RELATIONS

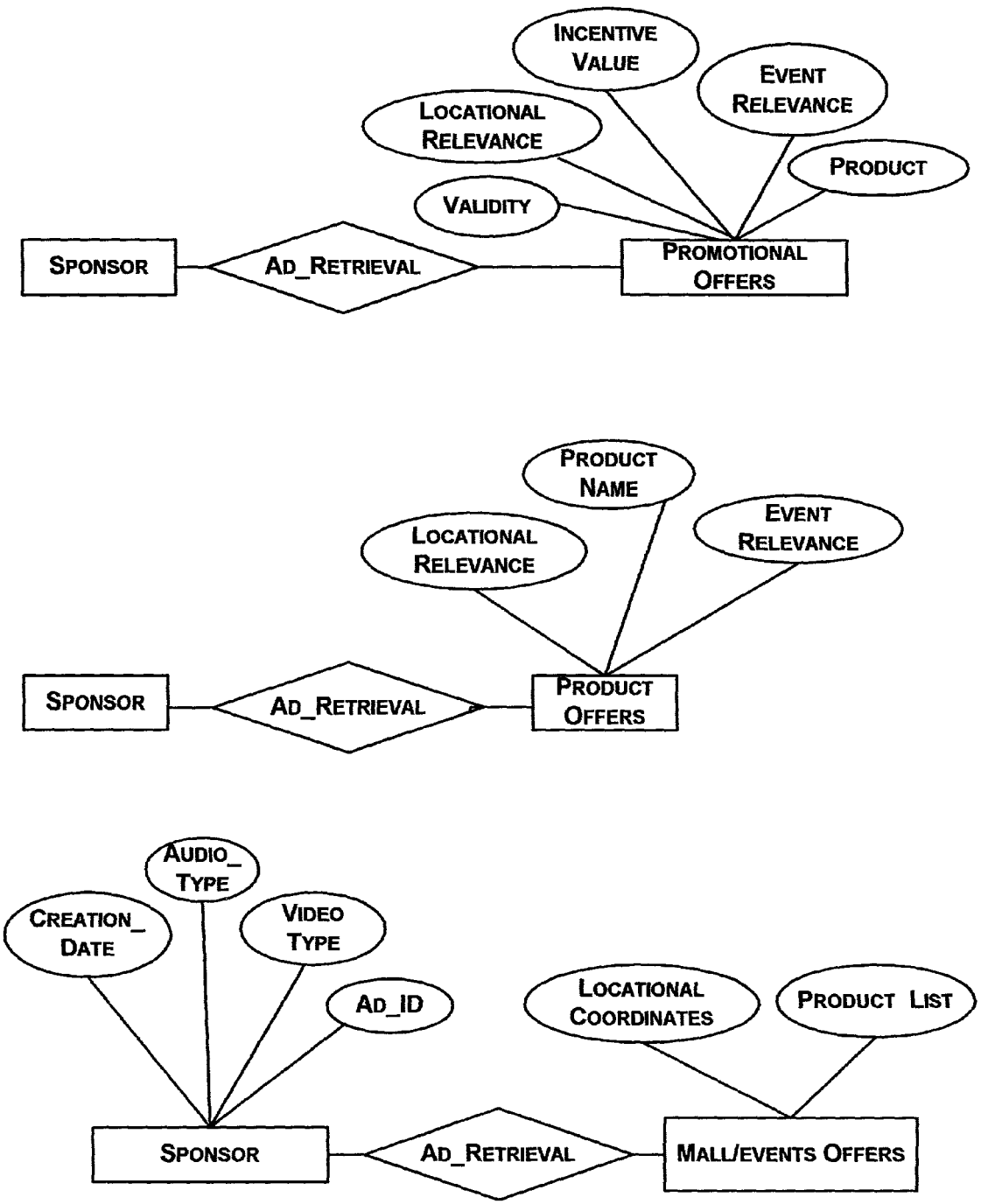
FIG-2D: AD COLLECTION ENTITY RELATIONS

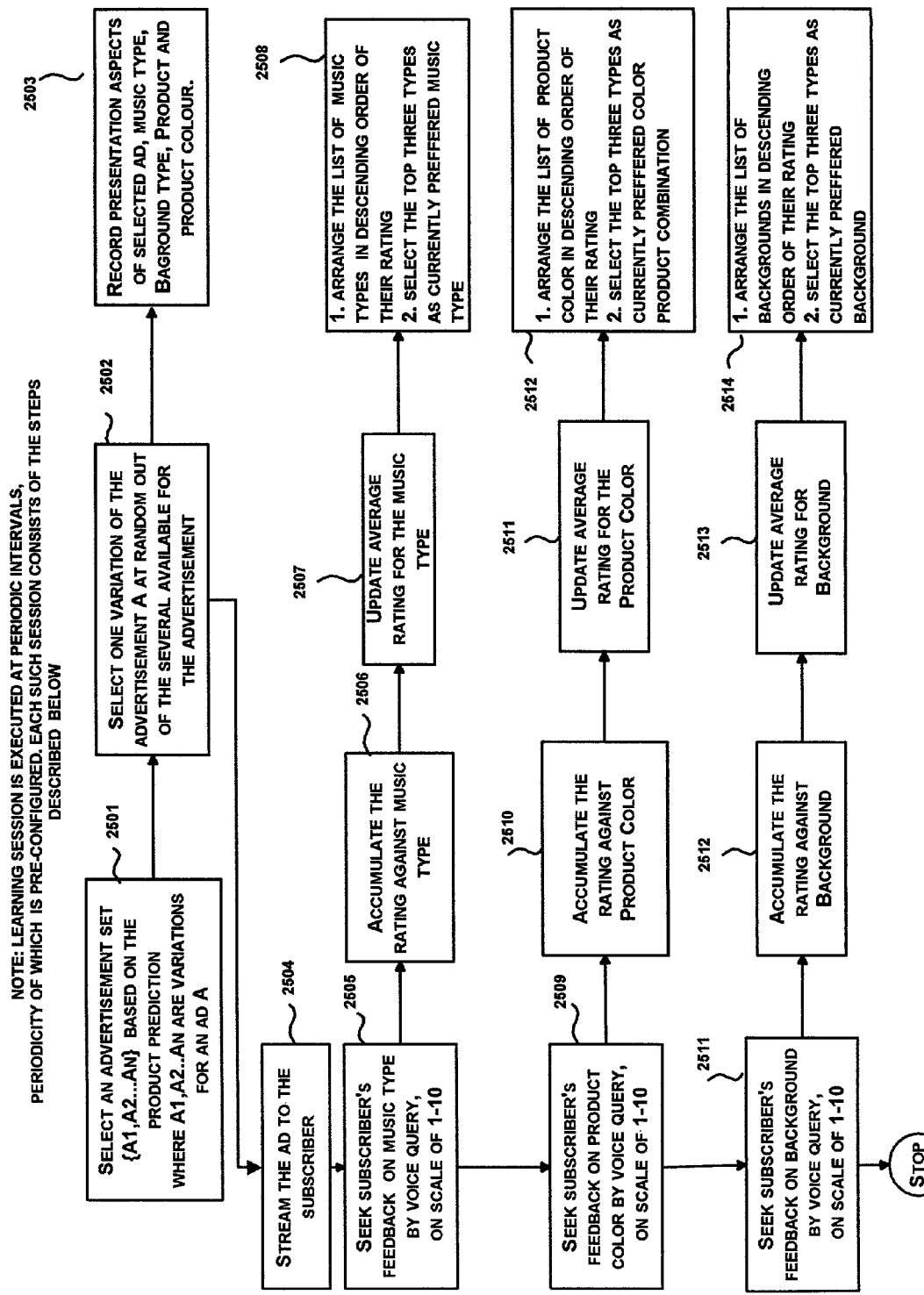

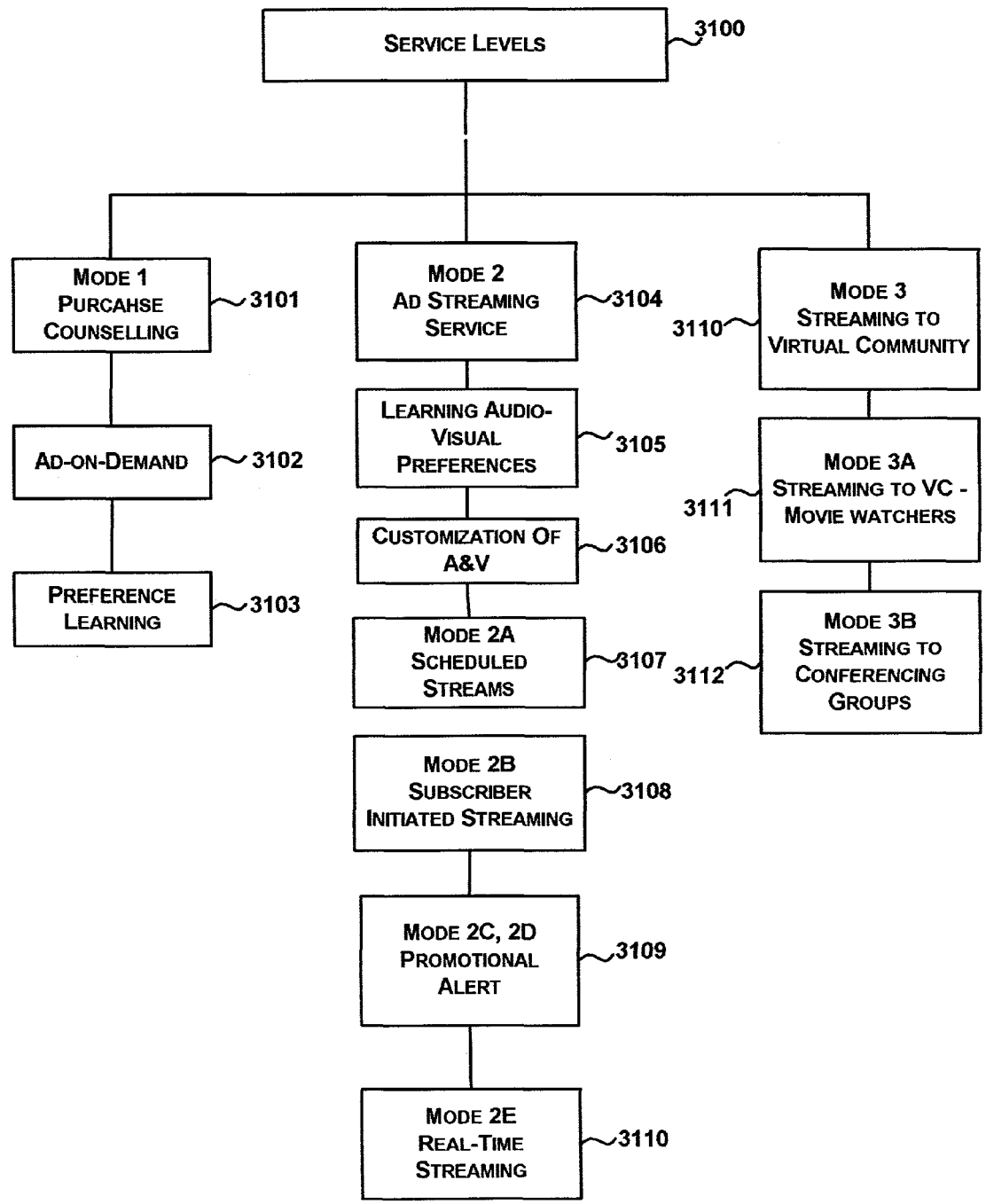
FIG-3A: SERVICE LEVELS IN PPAS

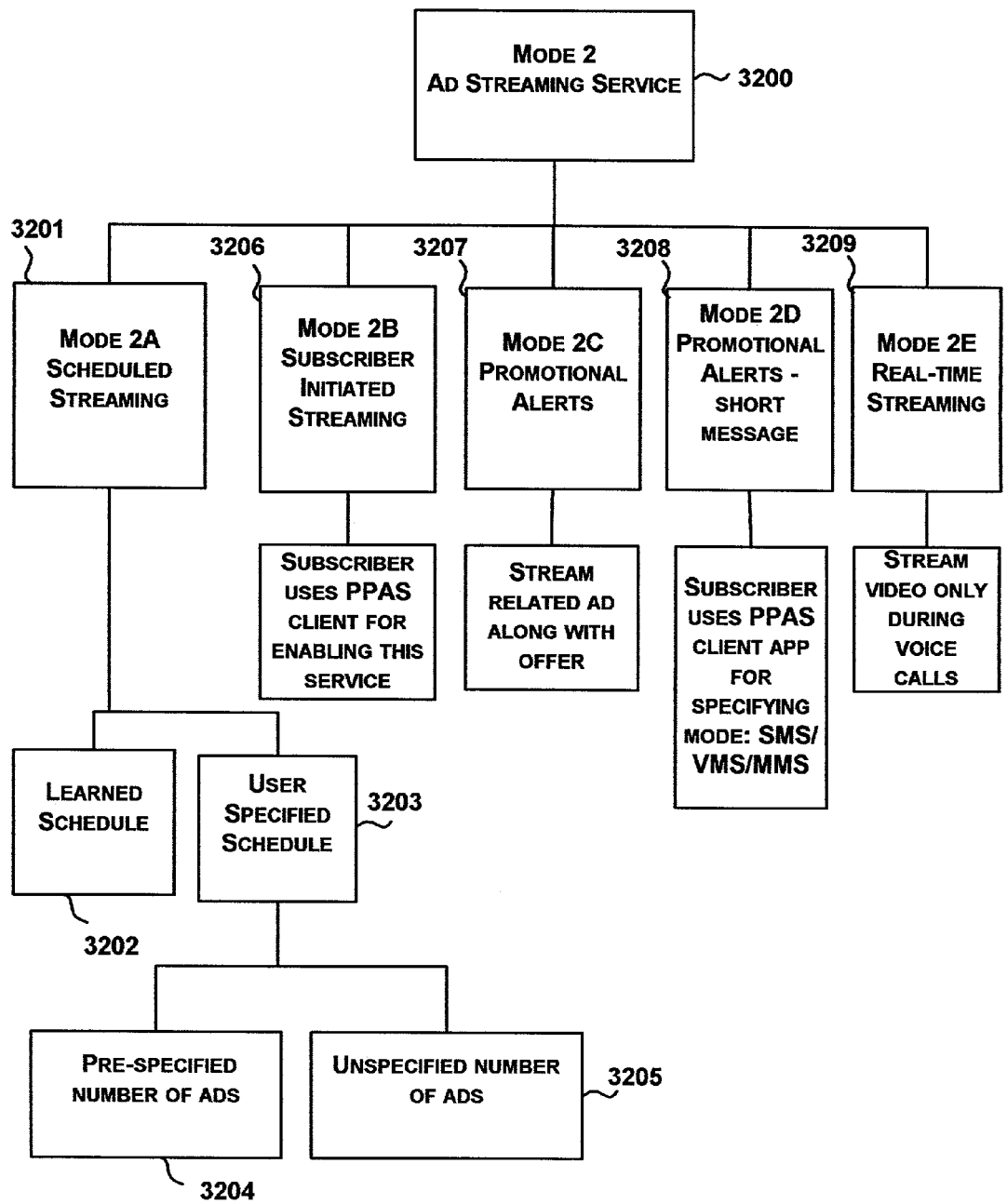
FIG-3B: MODE 2 (AD STREAMING SERVICE)

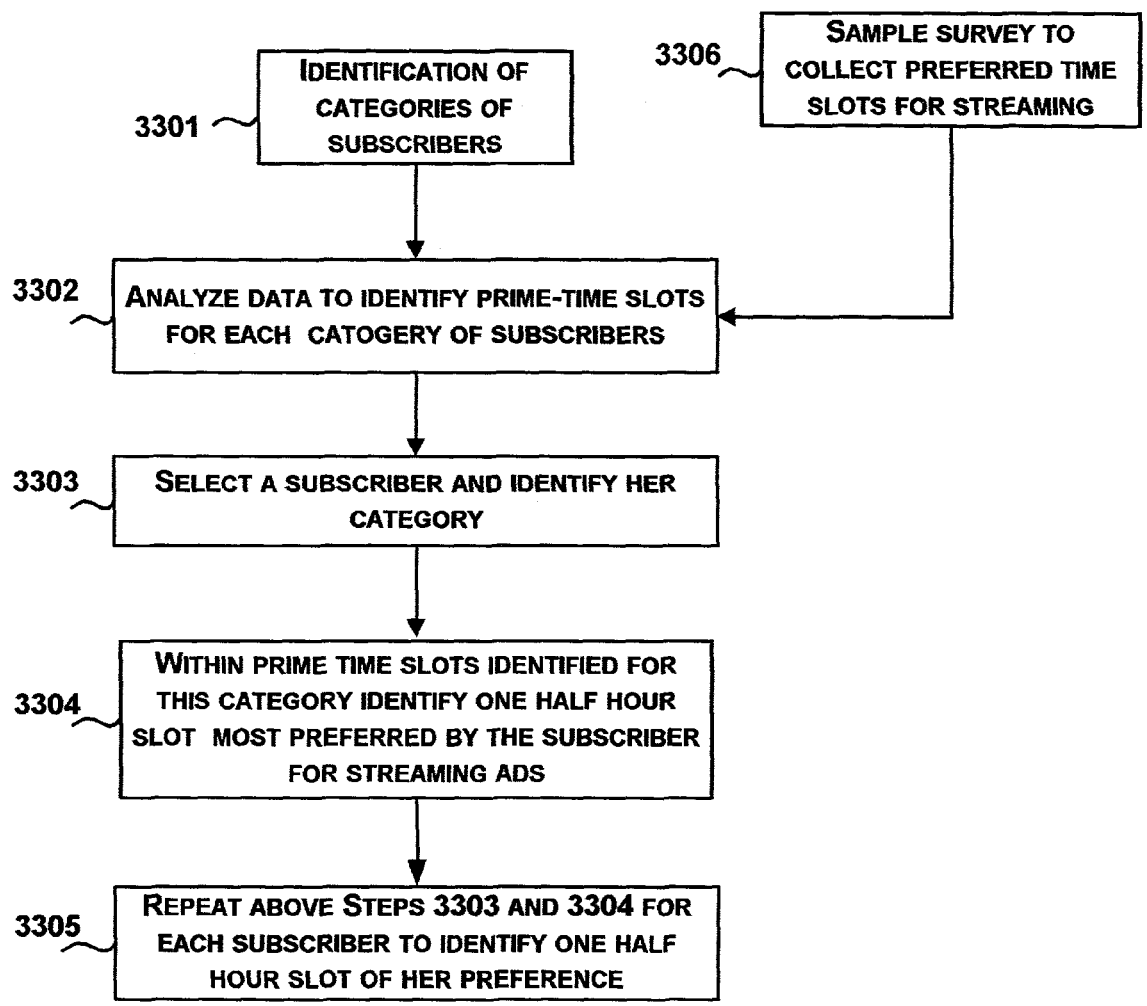
FIG-3C: ALGORITHM FOR LEARNING STREAMING SCHEDULE

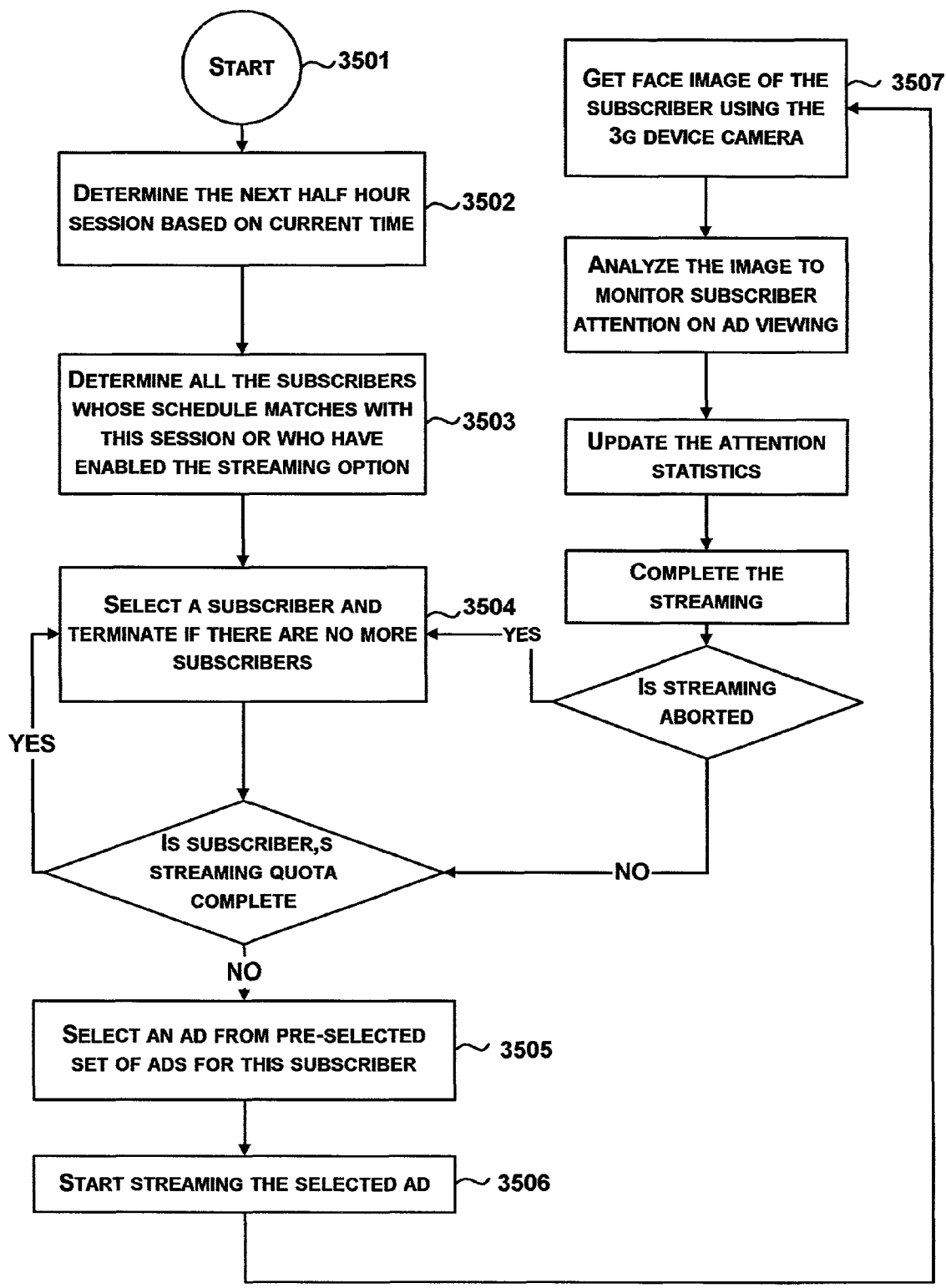
FIG-3D: ALGORITHM FOR STREAMING MANAGEMENT

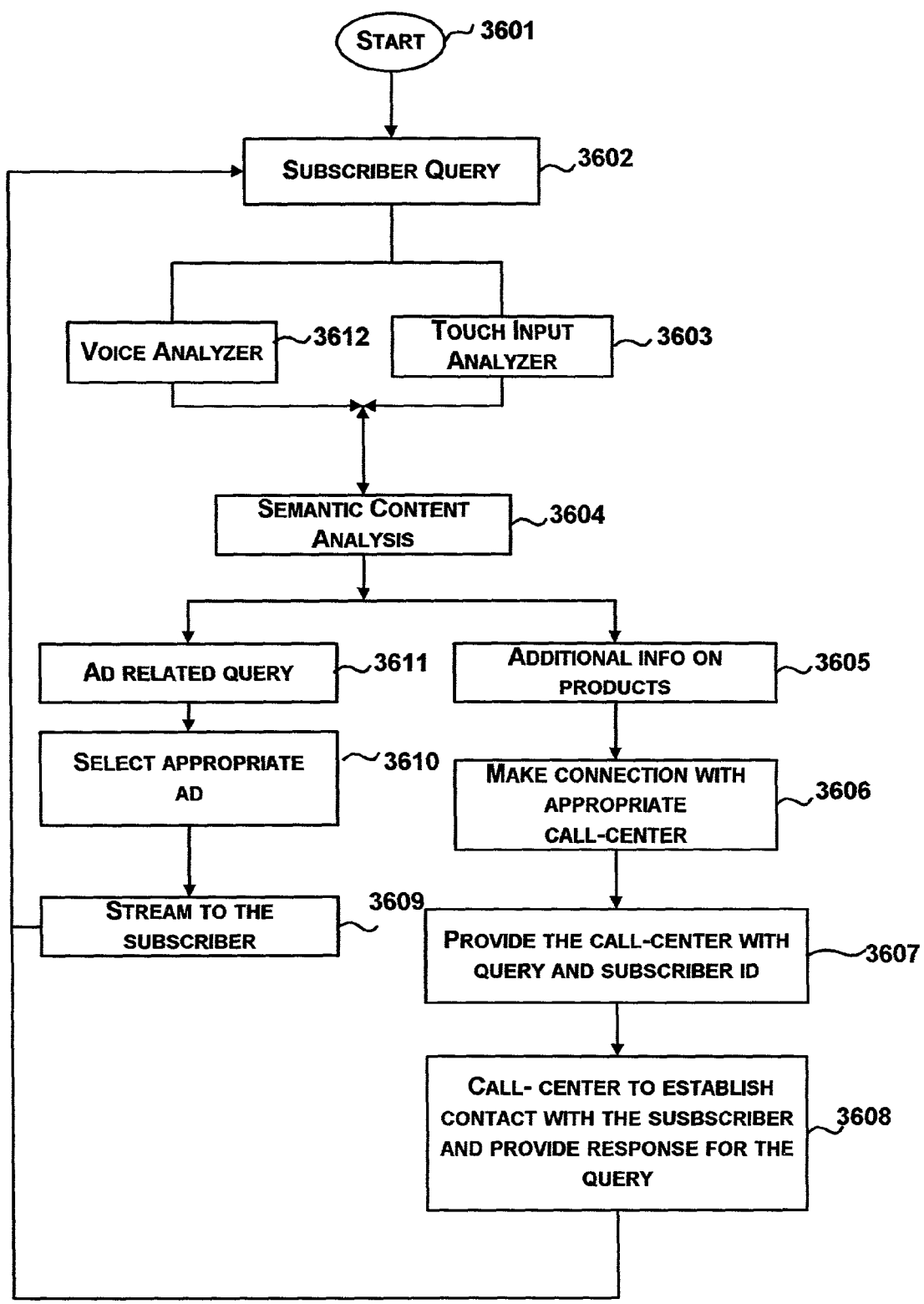
FIG-3E: ALGORITHM FOR INTERACTIVITY MANAGEMENT

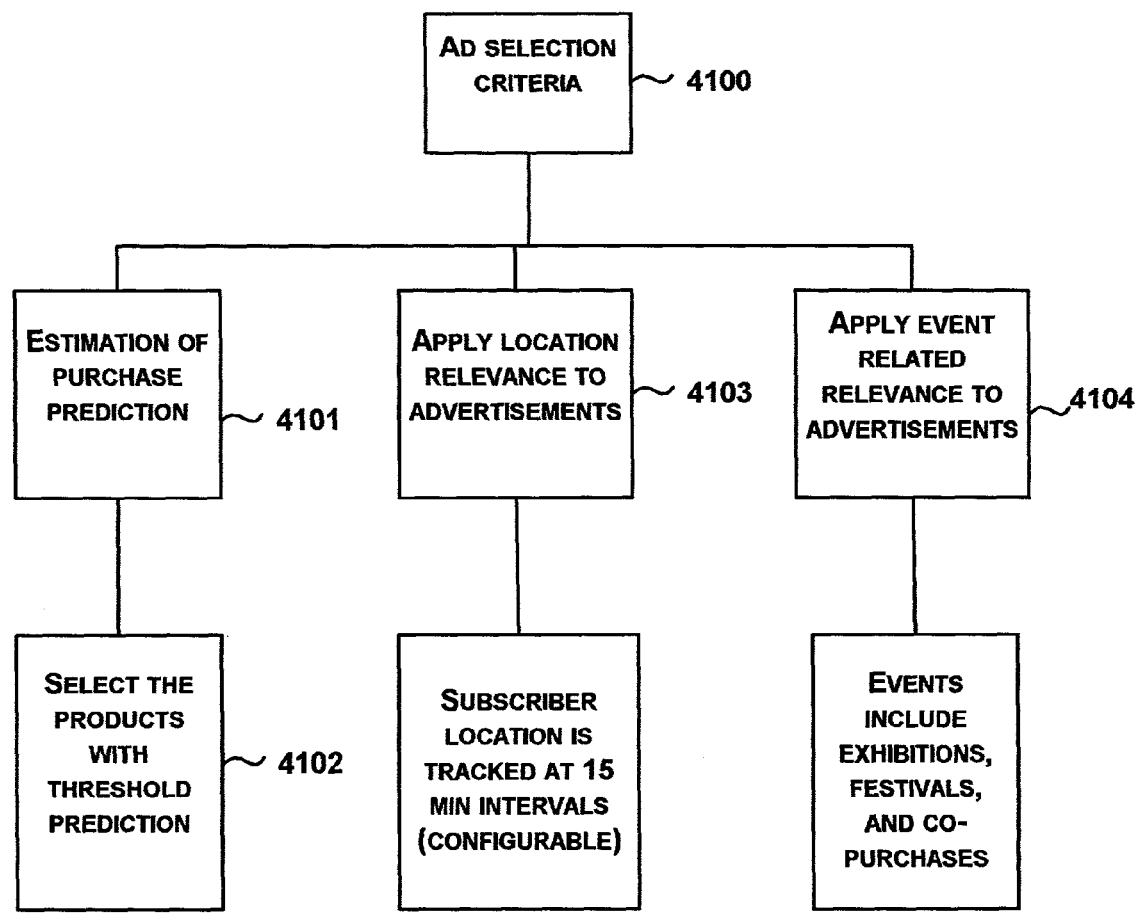
FIG-4A: AD SELECTION CRITERIA

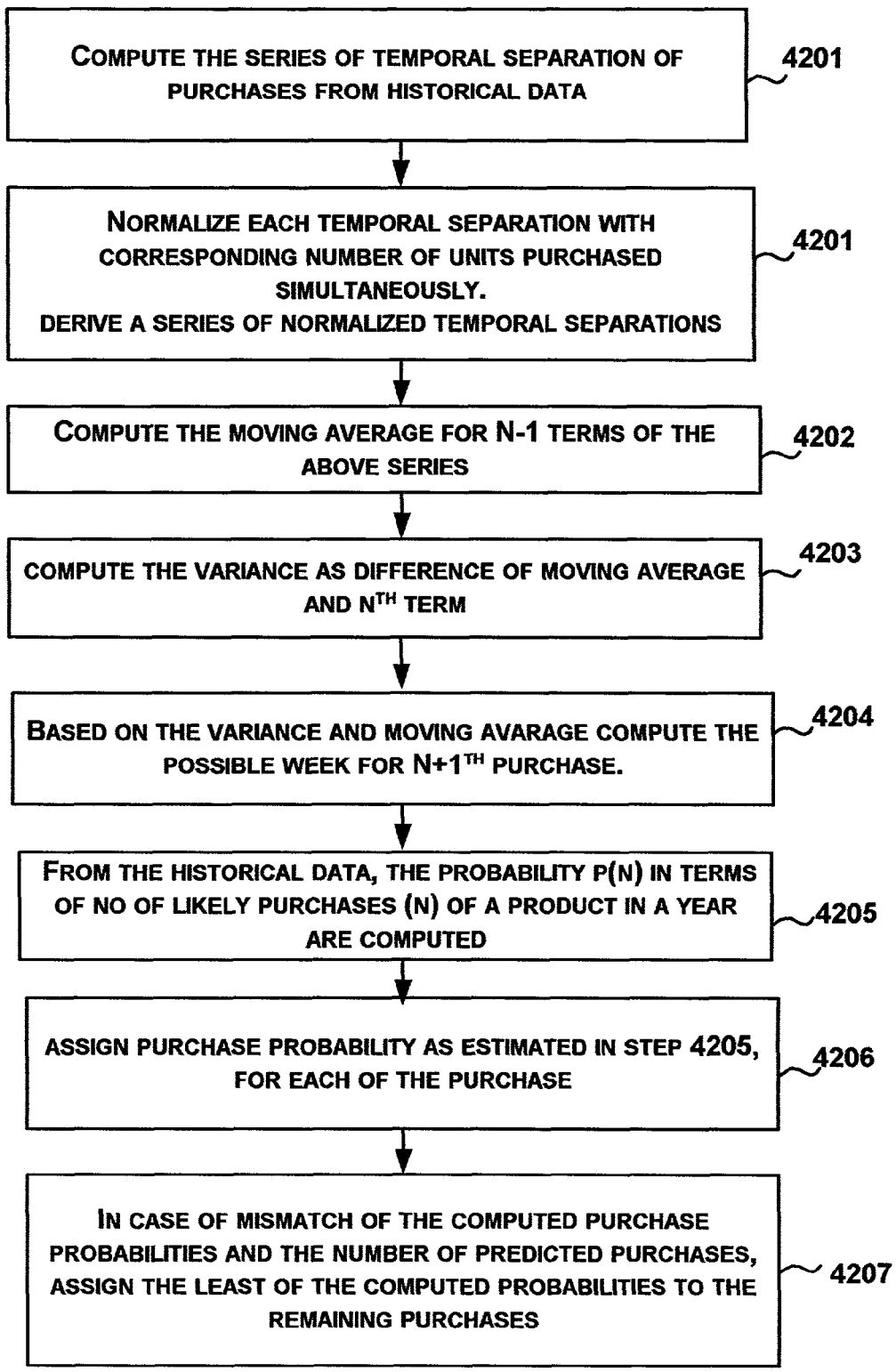
Fig-4b: Algorithm for Computing Purchase Prediction for Individual Products For a Subscriber

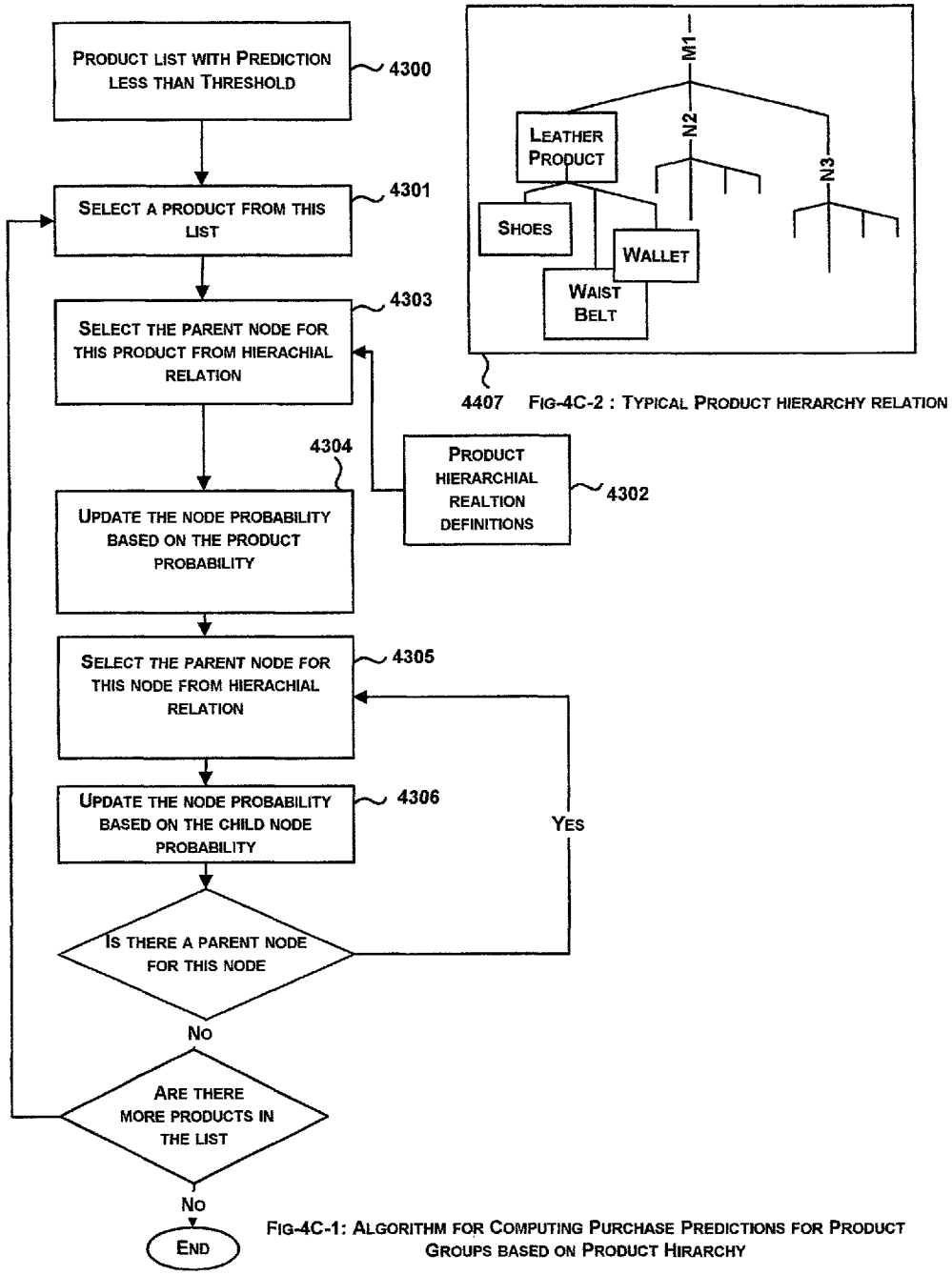
FIG-4C-1: ALGORITHM FOR COMPUTING PURCHASE PREDICTIONS FOR PRODUCT GROUPS BASED ON PRODUCT HIRARCHY
FIG-4C-2: TYPICAL PRODUCT HIERARCHY RELATION

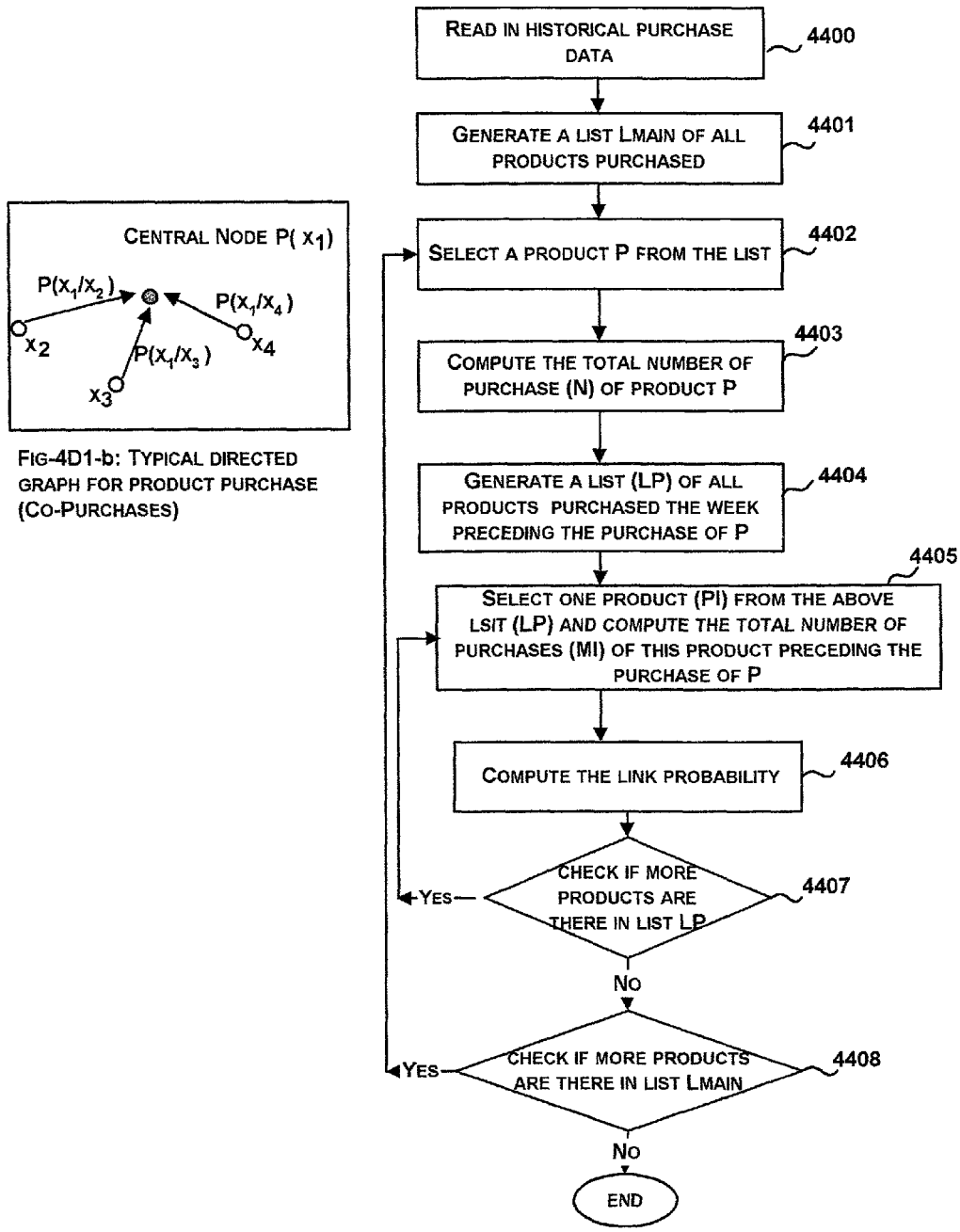
FIG-4D1-a: ALGORITHM FOR PURCHASE PREDICTION COMPUTATION (Co-Purchases)

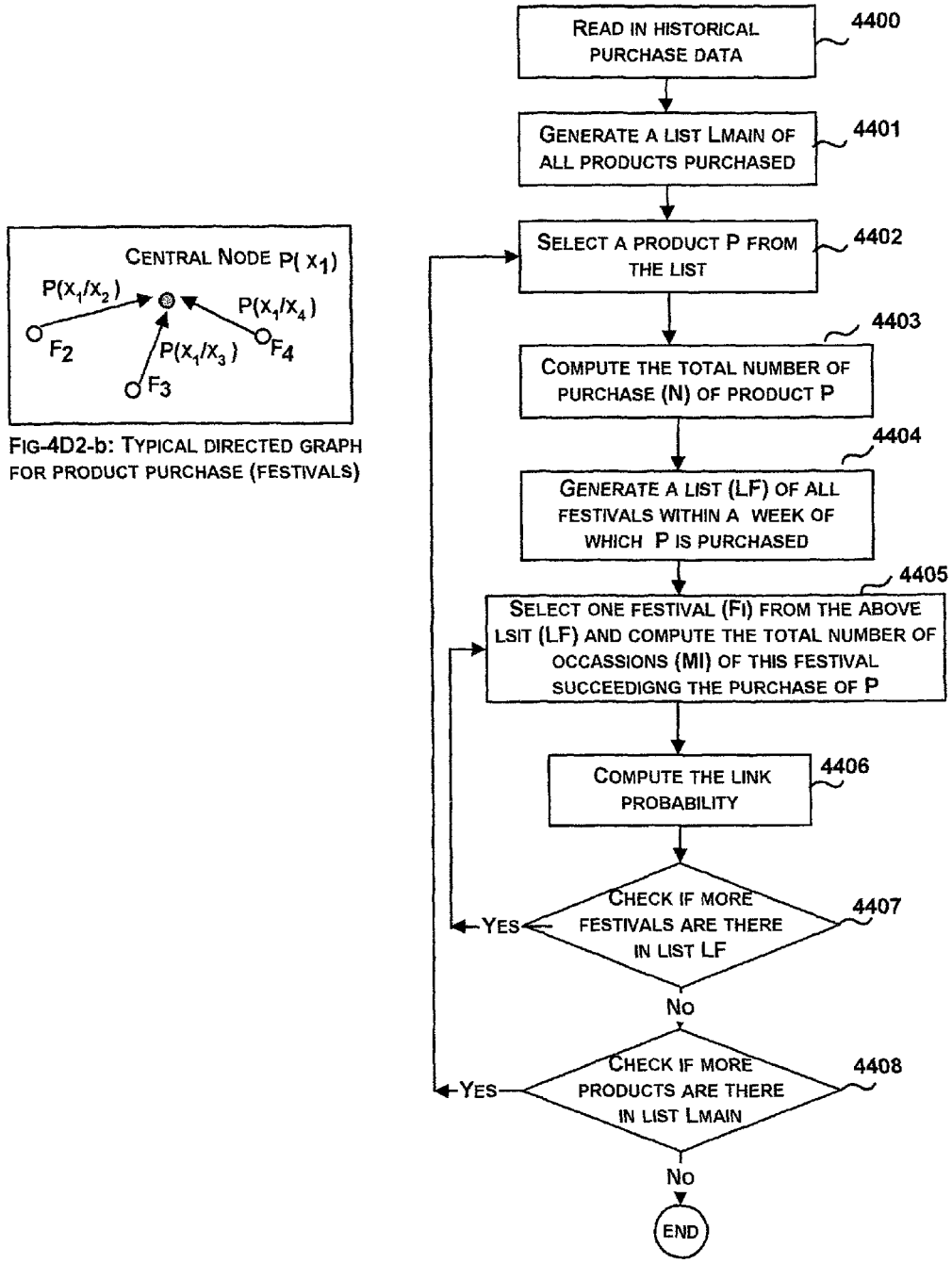

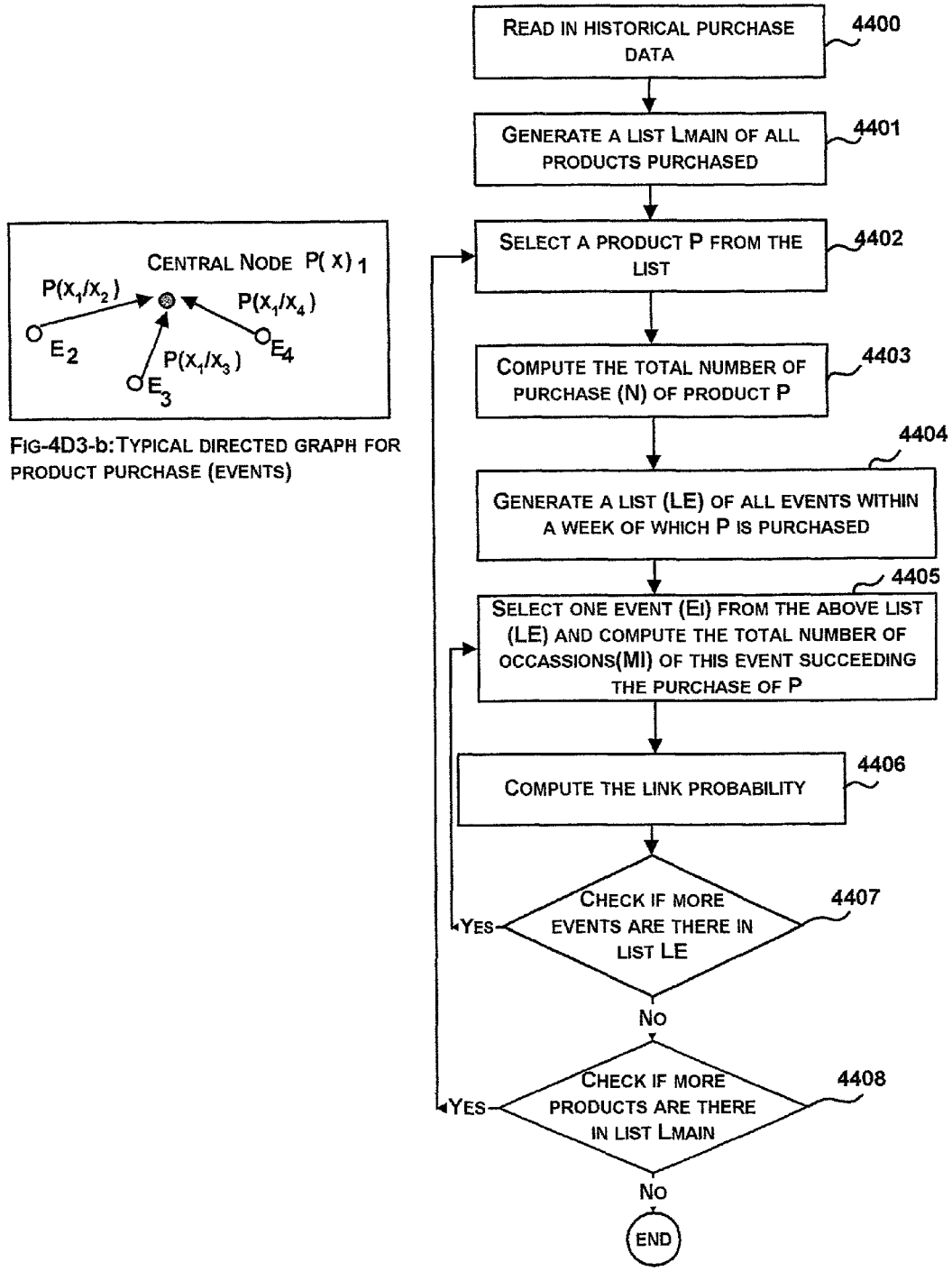
FIG-4D3-a: ALGORITHM FOR PURCHASE PREDICTION COMPUTATION (EVENTS)

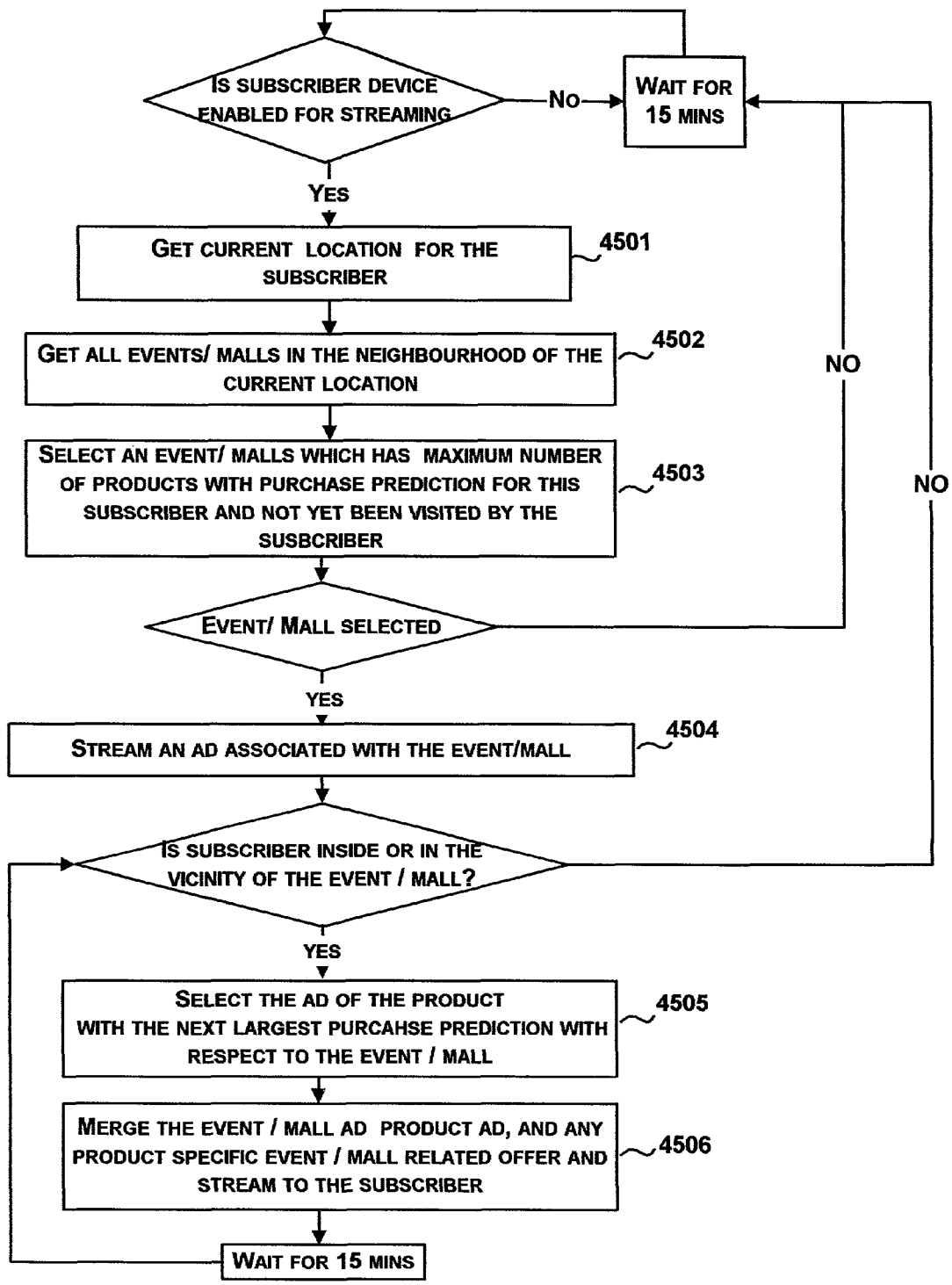
FIG-4E: ALGORITHM FOR AD SELECTION FOR EVENT- / MALL-SPECIFIC AD STREAMING

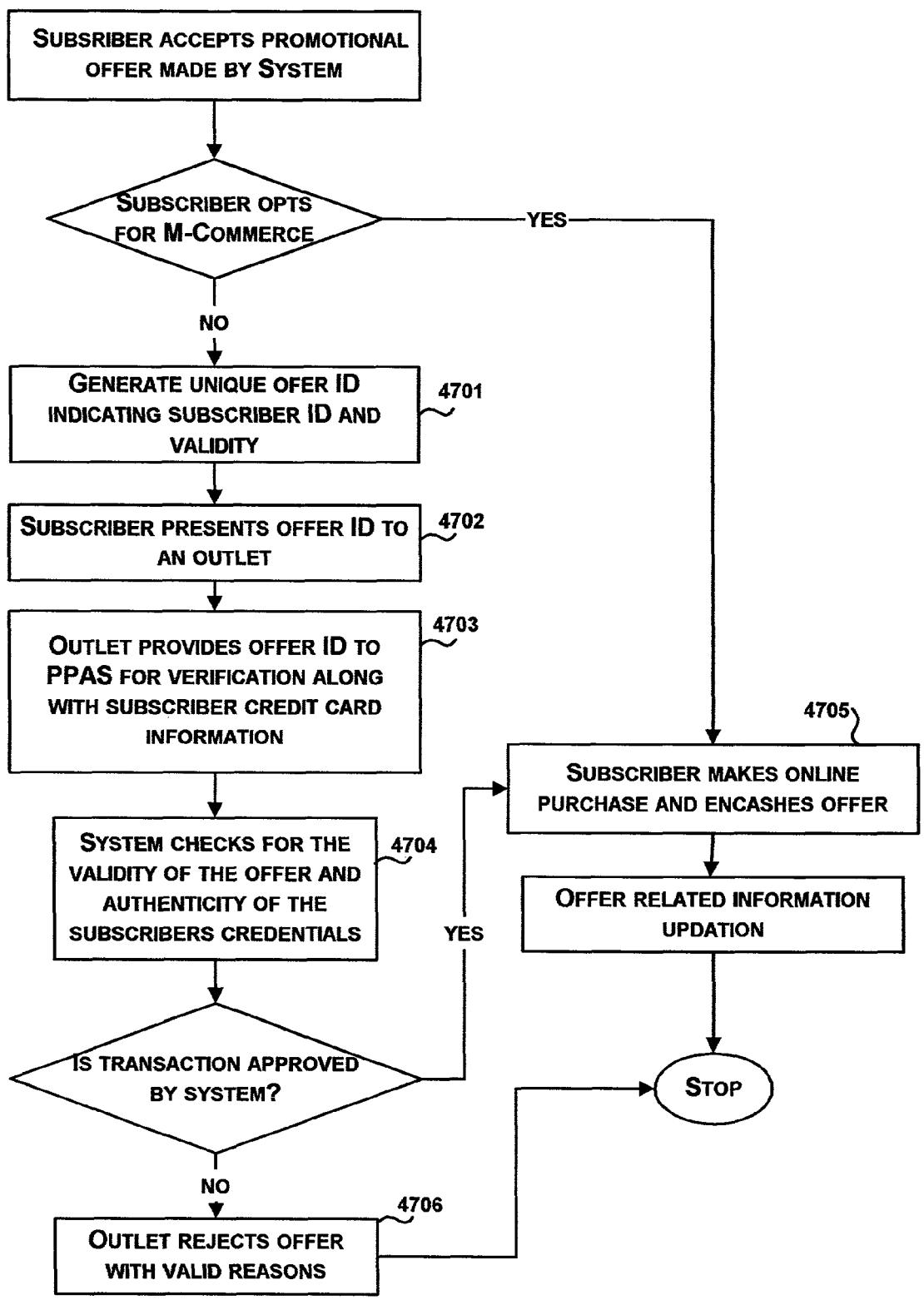
FIG-4F: FLOWCHART FOR PROMOTIONAL OFFER VALIDATION AND CONFIRMATION

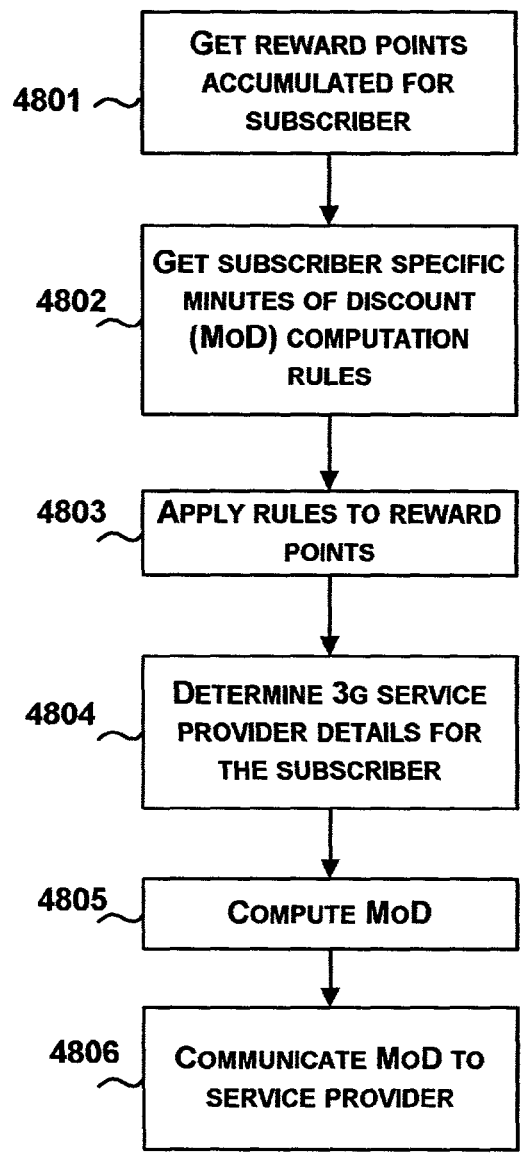
FIG-4G: ALGORITHM FOR MONTHLY BILLING COMPUTATION FOR A SUBSCRIBER

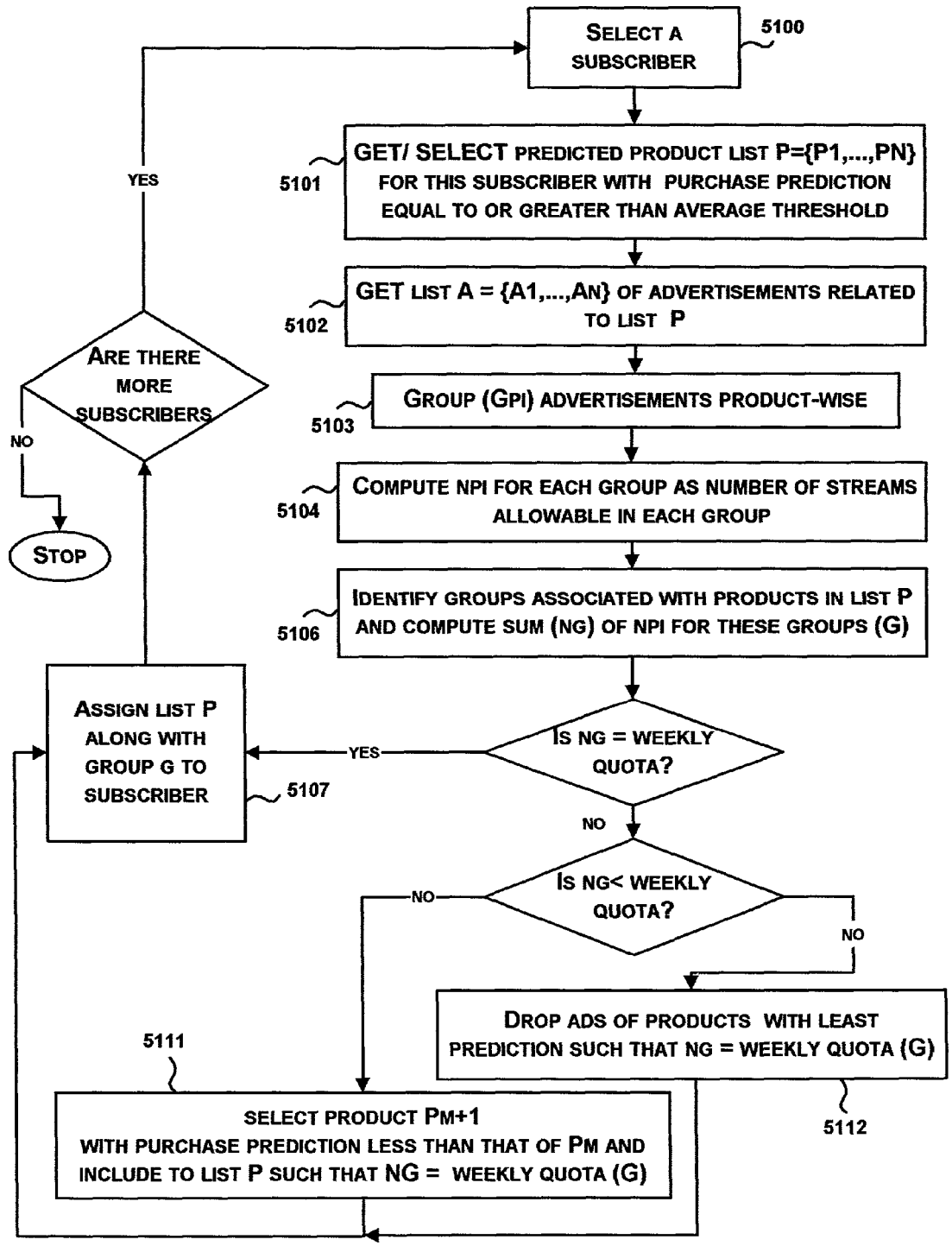
FIG- 5A: ALGORITHM FOR DERIVING WEEKLY PLAN FOR STREAMING

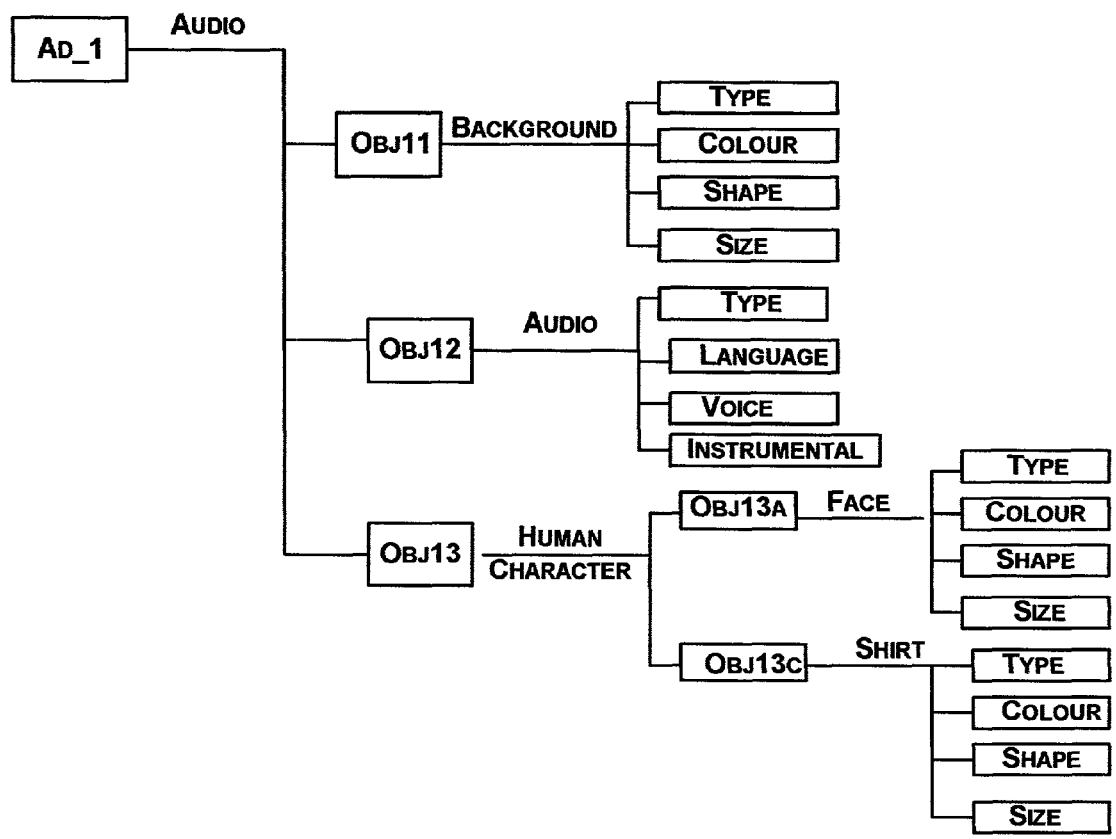
FIG-6A: TYPICAL OBJECT-ORIENTED REPRESENTATION OF AN ADVERTISEMENT

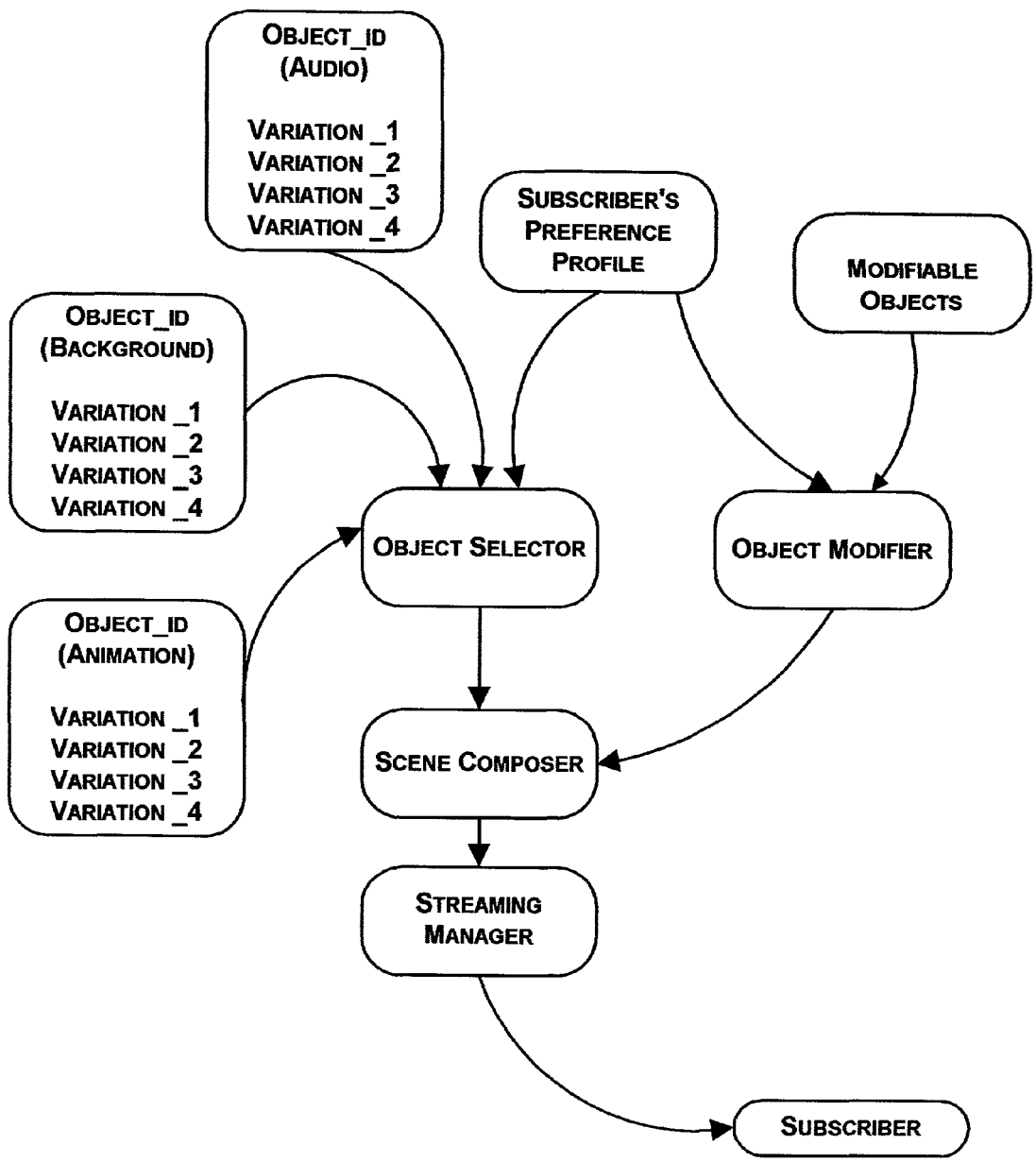
FIG-6B: ADVERTISMENT CUSTOMISATION

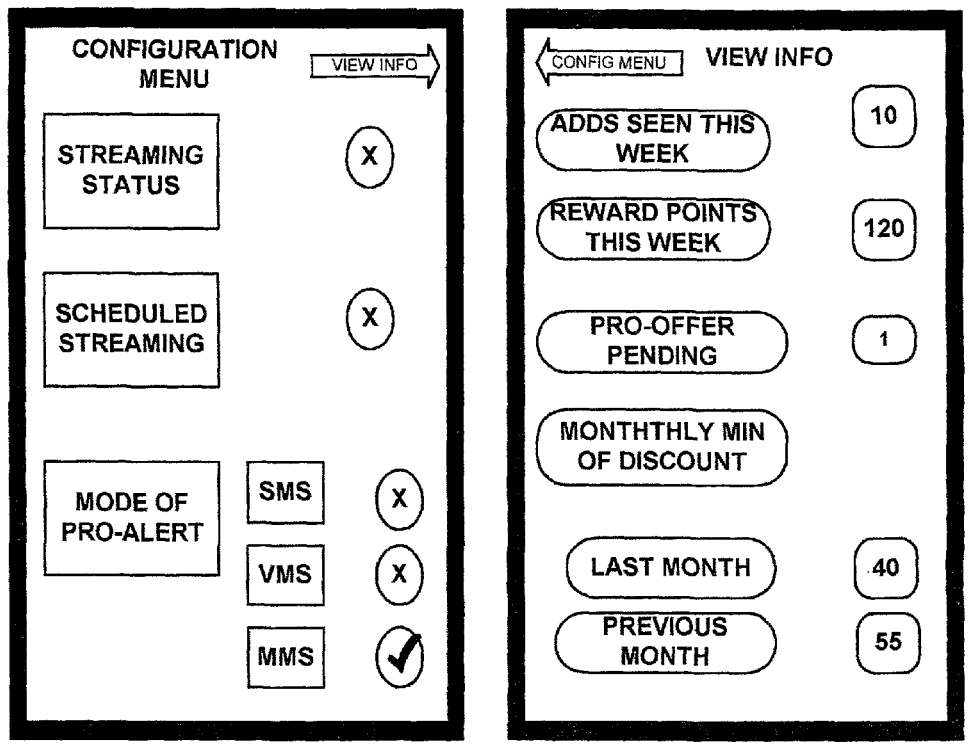
FIG-7A: PPAS CLIENT APPLICATION SCREEN ILLUSTRATIONS
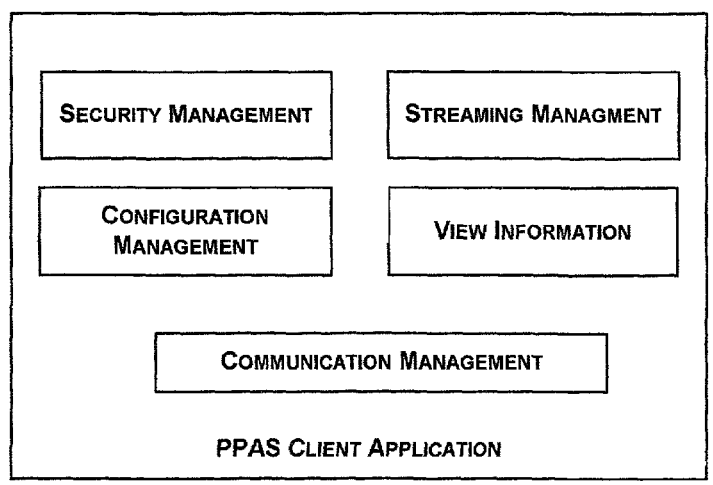
FIG-7B: PPAS CLIENT APPLICATION ARCHITECTURE

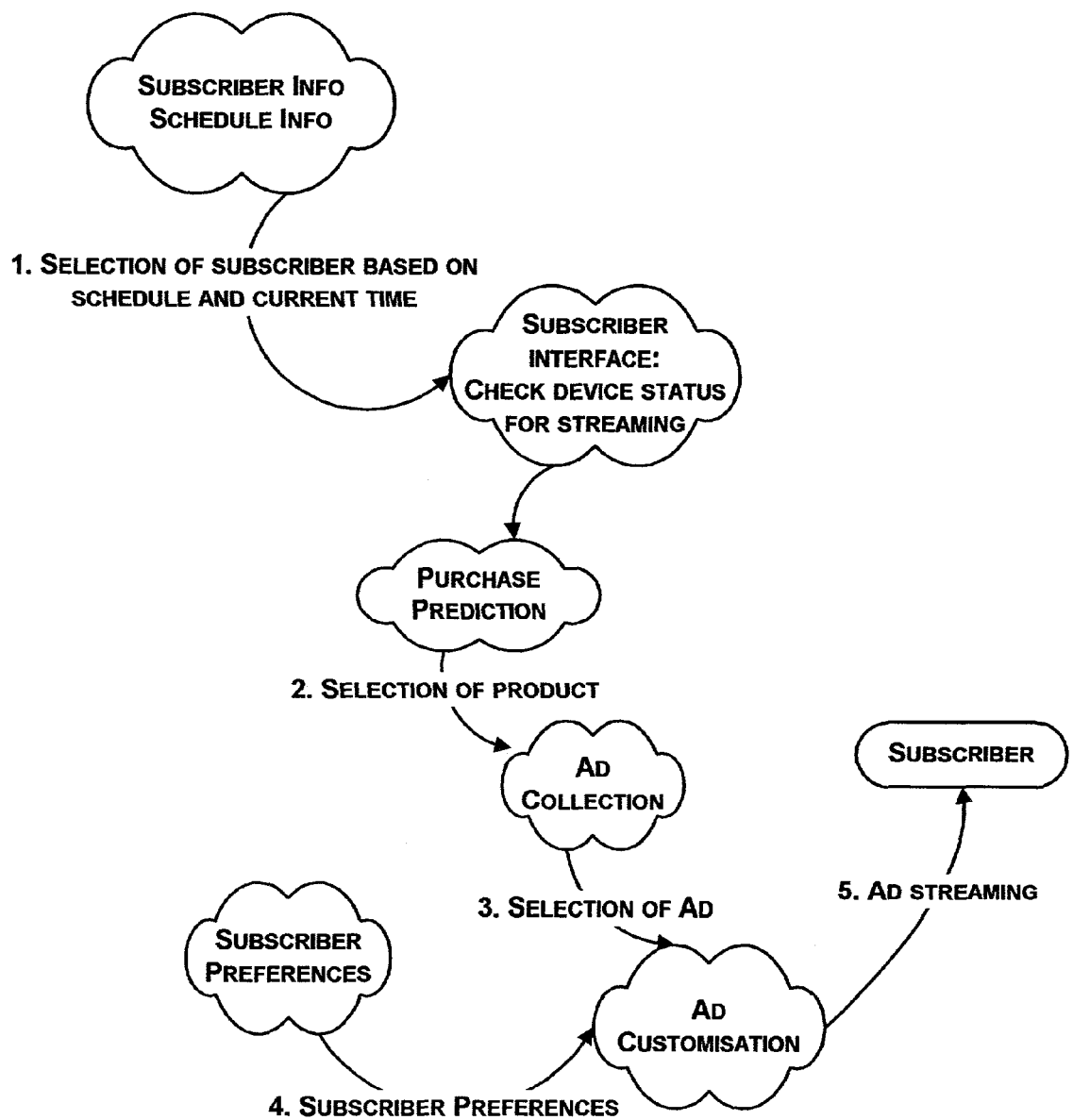
FIG-8A: SCHEDULED STREAMING SEQUENCE

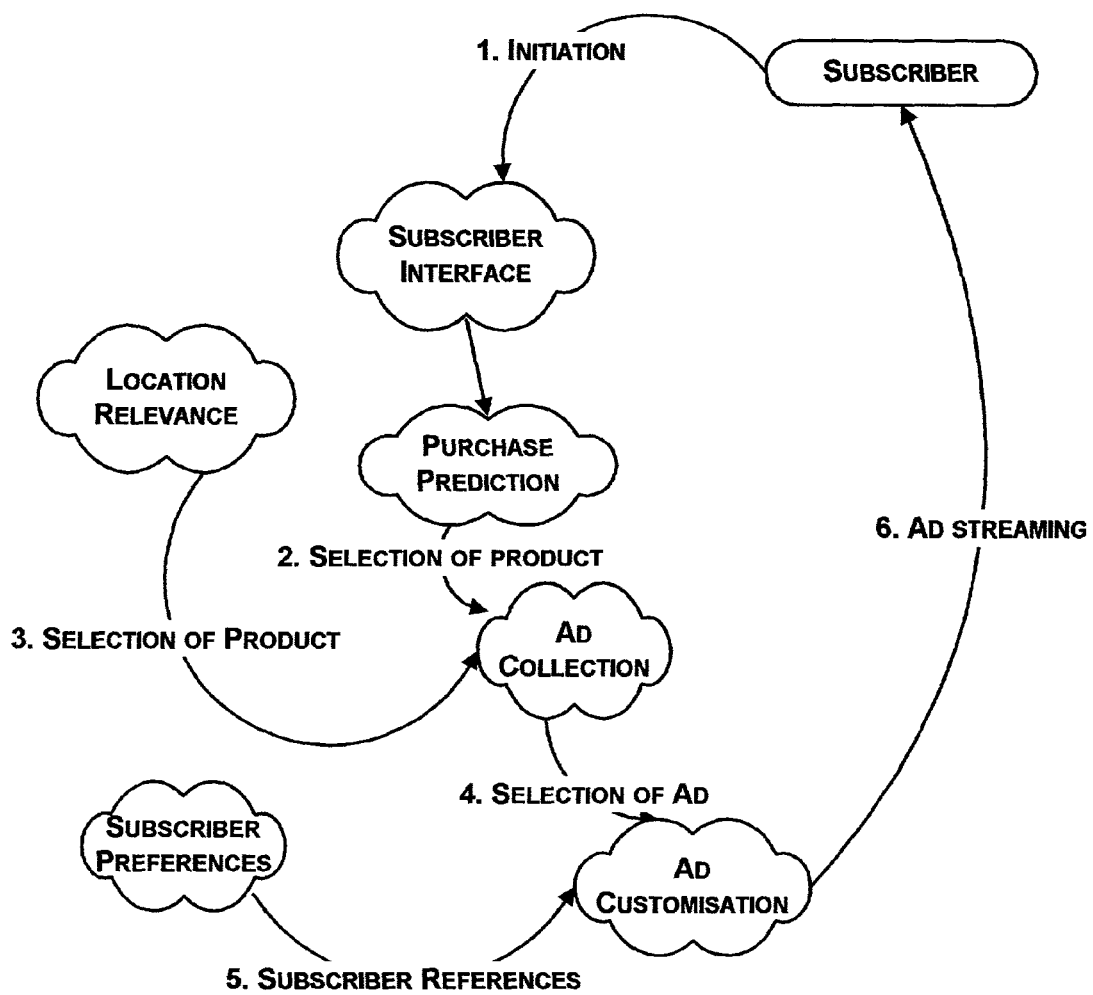
FIG-8B: SUBSCRIBER INITIATED STREAMING

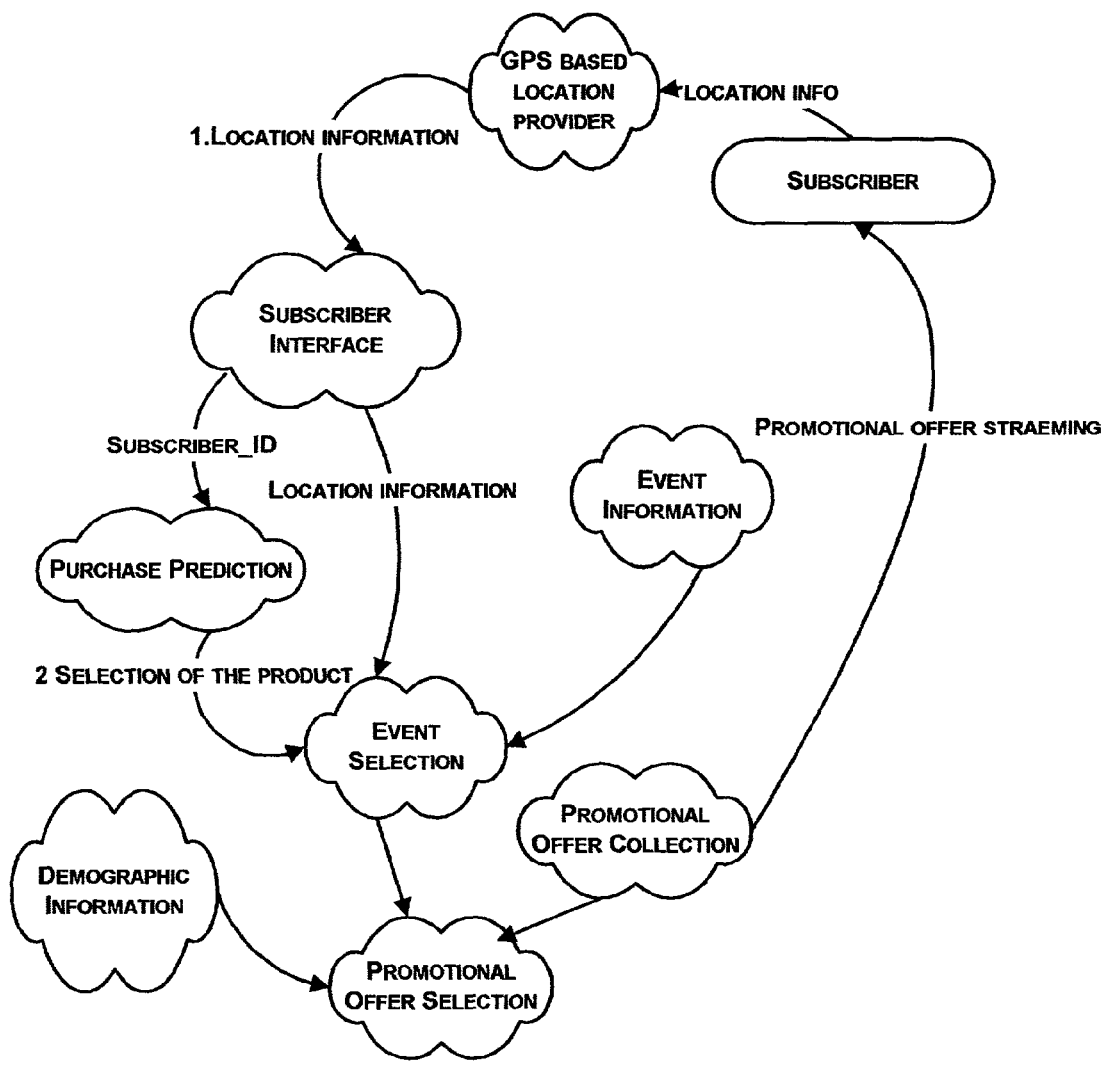
FIG-8C: EVENT SPECIFIC PROMOTIONAL AD STREAMING

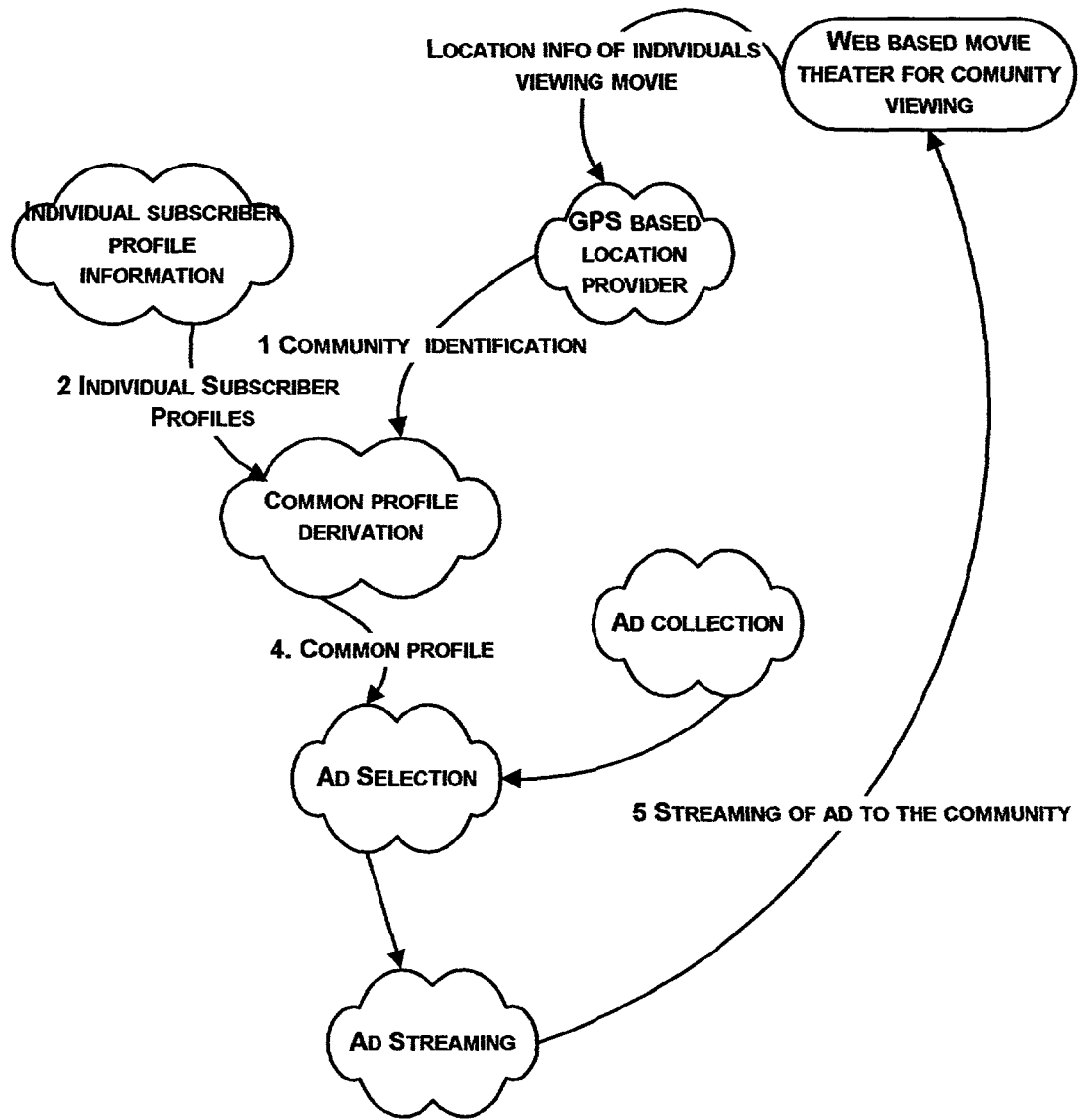
FIG-8D: AD STREAMING TO VIRTUAL COMMUNITIES - PRIVATE MOVIE SCREENING

SYSTEM AND METHOD FOR SELECTIVE TRANSMISSION OF MULTIMEDIA BASED ON SUBSCRIBER BEHAVIORAL MODEL

FIELD OF INVENTION

The present invention relates to advertising and more particularly to advertisement through third generation (3G) mobile devices. Still more particularly, the present invention relates to systems and methods for selection, adaptation and delivery of advertisements suitable to purchase profiles of individual purchasers and contextual relevance such as purchaser's current location.

BACKGROUND OF THE INVENTION

With product monopolies disappearing very fast and competition ever increasing, today a consumer has scores of options in every aspect of life. One direct consequence of this competition is that the products are being aimed to suit more and more personalized needs of the consumer. On the other hand with explosion of cable TV and Internet, a consumer has become more accessible to the advertiser than ever before. Result of these two developments has generated current interest in targeted advertising which mainly aims at the effective use of the personal media for more result-oriented advertising. Third generation mobile phone shall play an important role in enhancing the effectiveness of target advertisement in near future. Unlike the previous strategies of targeted advertisement, where the targeting can be focused at a level of a community or geographical location, targeting can now be focused on an individual through their mobile phones or personal desktops. This improves the impact of the advertisement on the consumer and possibly increases the probability of purchase of the product. Technology related to third and fourth generation mobile telephony and its potential to provide rich audio visual content to the user has created a large number of new possibilities for target advertising.

The key to success of target advertising lies in the precision of selecting right advertisement for a potential buyer or right buyer for a given advertisement. Contrary to this, the normal advertisement on a conventional media aims at larger audience rather than greater precision. The importance of precision in target advertising comes from the fact that the cost of advertising is directly proportional to number of potential buyers addressed and therefore any miss-target means wastage of resources. However, targeting the right buyer has always been a difficult task. Some of the prior art focused on identifying target groups and communities who are likely to be suitable for a given advertisement. While this approach may be successful in brand building and achieving product awareness, its impact in influencing actual purchase will only be moderate.

With more personalized media available such as a mobile phone with audio and video capabilities, it is now possible to design advertising models which can stream personalized advertisements based on a precise profile analysis of the prospective buyer. These models essentially are those which are based on the principle of buying the attention of the viewer for a price. Some of the prior arts such as the one proposed in U.S. Pat. No. 5,794,210, entitled "Attention Brokerage," of which A. Nathaniel Goldhaber and Gary Fitts are the inventors, describes a system; in which the consumer is offered with a list of options of advertisements along with accompanying incentives. In the above invention, the focus is confined to the advertising on computer networks and the targeting is based on the demographic profile of the prospective buyer. These profiles are derived from the information voluntarily supplied and by subsequent actions on the Internet by the individuals and are not based on their previous purchase transactions and hence not based on any purchase prediction.

One of the prior art exists in the form of a product by SLP InfoWare wherein the behavior of an existing customer of a particular service is analyzed based on the her transactions such as her enquiry, her debt credit history etc. This product has application in predicting the behavior of customer by analyzing her the online transactions and predicts the possible purchases. However this product address the behavior prediction based on in house transaction data available with a service provider or data on online transaction on the web does not address the transaction data related to the retail purchases made by the customer.

In the model of advertisement where incentive is offered for accepting the targeted advertisement, there is a greater necessity for the advertisement to be relevant to the prospective buyer's profile in general and to his/her immediate purchase requirements in particular. The key issue in such an advertising model is acquiring of an individual profile model for each prospective buyer based on which a relevant advertisement can be selected. The main challenge is in acquiring the data related to the individual's transaction and then extracting a dependable model of his/her behavior and purchase pattern from this data. Some of the prior arts have addressed the selection of advertisements for the targeted buyer using demographic information of the buyers and comparing with that of the previous buyers of the same product. U.S. Pat. No. 5,515,098, entitled "System and method for selectively distributing commercial messages over a communications network," of which John B. Carles is the inventor, employs this approach in selecting the advertisements for prospective buyers based on the demographic information of the customers who have already bought the product. This invention addresses the question of targeting advertisements to individual or a group of household connected by communication networks and assumes that such a network has a capability to distribute distinct content to individual device terminals. However, the profiles considered are not of individuals but groups such as members of a household.

Another prior art as described in U.S. Pat. No. 6,216,129, entitled "Advertisement selection system supporting discretionary target market characteristics," of which Eldering; Charles A. are the inventors, describes an advertisement selection system in which vectors describing an actual or hypothetical market for a product is determined. This system uses consumer characterization vector, which is correlated with the advertisement characterization vector to determine the suitability of the advertisement to the consumer, the consumer profile is mainly derived from demographic profile and purchase transactions. Based on this data, a set of Heuristic rules defining a probabilistic measure of demographic characteristics of a person performing the transactions is derived; these rules are used to define the profile of consumer based on her demographic characteristics. This system uses a statistical approach in identifying a consumer suitable for a given advertisement. However, in a scenario where more personalized devices such as third generation mobile phone is available, there is an opportunity for precise targeting of an advertisement based on the individual consumer profile rather than using a statistical correlation of demographic information.

Another aspect of target advertisement is the matching of the presentation aspects of the advertisement. It is a well-appreciated fact that the value of an advertisement solely depends on its ability to attract and retain the attention of a viewer. And therefore, advertisement customized to suit the viewer's specific preferences would be more successful in retaining the viewer's attention. A target advertisement would require a system which would on one hand, learn the preferences of an individual and on the other hand, customize the advertisement to suite the viewer's preferences. This system would be more effective if this learning of the profile and subsequent customization can be automated.

In light of the above, there is a need for a comprehensive system, to account for the following aspects of the target advertisement,
1. The advertisement selection should be based on the characteristics of individual subscribers.
2. The ad selection should be relevant to the purchase prediction made for the individual subscriber.
3. Purchase prediction should be based on the multiple factors, which are likely to influence the purchase such as festivals, sales events, personal events etc.
4. The selected ad should have relevance to the current location of the subscriber.
5. System should be capable of learning subscriber characteristics
6. Customize the advertisement to suit the subscriber's audio-visual preferences.
7. Capability to provide with promotional offers suitable to the individual characteristics of the subscriber.
8. Interactive advertisement streaming which facilitates viewer's interaction with the system.
9. System with overall flexibility in streaming to suit the viewer's convenience and preferences.
10. Use m-commerce to facilitate online transactions related to the advertisements viewed.
11. To provide counseling and information on the products or services desired by the viewer based on advertisements and through the associated call centers.

SUMMARY OF THE INVENTION

The present invention describes a system for streaming to specific individuals who are subscribers to the system and are prospective buyers of a product or service featured in the advertisements that are part of the system. As part of this target advertising model, different service levels are offered to the subscriber depending on the choices she makes at the beginning of the subscription or periodically thereafter. This system mainly identifies the suitability of an advertisement to a subscriber based on a set of pre-defined criteria. One of the preferred embodiments of this system consists of a subsystem for storing and managing the subscriber information such as Subscribed service levels, Demographic information, Historical data of product purchases, Type(s) of terminal device (s), Preferred streaming schedule, and Preferred presentation aspects, and the effective analysis of ad v/s purchase; Similarly, a separate sub-module manages the characteristic data such as featured product, and target consumer information of the advertisement content. The characteristic information on each of the advertisement is collected in custom designed format to facilitate fast and accurate retrieval in response to a query. The content provider who is the sponsor provides these characteristic data of the advertisement.

In this embodiment, at one of the service levels, the system provides a streaming service aimed at providing purchase counseling in which the subscriber queries for relevant information on a product or service by providing simple query by voice, text or through touch sensitive screen, on a product or service. In response to this, system selects the relevant available advertisements and streams the same to the subscriber. This is an interactive service wherein the subscriber can requests for additional information and make purchases online by making use of the voice option or through the touch sensitive screen on the 3G device.

At one of the service levels of this embodiment, the system learns the subscribers preferences in terms of audiovisual, animation and musical content, based on the interactions with the subscriber. The system further consists of means to modify the basic advertisement available within the system to suit the learned preferences of the subscriber. These preferences are in terms of the language for audio, color combination, background for visuals, favorite personalities etc.

Yet another service level in this embodiment offers streaming of targeted advertisements to the subscriber as per the schedules requested by her. The advertisements for such a streaming are selected based on their matching with one or more relevance criteria. These criteria consist of location relevance, purchase prediction, and event related relevance. In those cases where none of these criteria are applicable, the advertisement is selected based on the criterion of loyalty of the subscriber towards one or more brands as indicated by the her historical purchase data.

Another service level in this embodiment offers streaming of advertisement in response to an initiation by the subscriber. In this service, subscriber conveys his willingness to receive advertisement at that time. The criterion for the selection of the advertisement remains same as in the previous service level.

Another service level in this embodiment offers promotional alerts in which whenever one or more of the above criteria are met, system checks if subscriber is ready to accept the streaming by checking the flag enabled by the subscriber for this purpose and the advertisements are streamed if this flag is enabled. As an optional service, promotional alerts are provided in the form of SMS (text message), MMS (multimedia), VMS (voice messages). A method for tracking the realization of the promotional offers is included in this embodiment. Promotional offers made to each subscriber are tracked and recorded when they are realized by the subscriber.

In an alternate embodiment, the system offers a service level in which the advertisements are streamed to virtual communities such as private group of people watching a movie show. Here, the system selects an advertisement based on the collective profile of the subscriber who are present in the gathering. Another service level offers similar service to groups involved in video conferencing.

In this embodiment, a sub-system for learning the following are provided:
  Learning model based on Bayesian networks for learning the influence of external events on the pattern of purchase of a product.
  Learning a model for purchase pattern for each product by time series analysis.

These and other features and objects of the invention will be more fully understood from the following detailed description of the preferred embodiments, which should be read in conjunction with accompanying drawings.

BRIEF DESCRIPTION OF DRAWINGS

FIG. 1A-1 and FIG. 1A-2 illustrate the network and system architecture of Purchase Prediction based Advertisement System (PPAS).

FIG. 1B illustrates the interface between the subscriber and PPAS.

FIG. 2A through FIG. 2D illustrates the various entity relationships of the system.

FIG. 3A illustrates various service levels in PPAS.

FIG. 3B illustrates the service level Mode-2 (Ad-Streaming service).

FIG. 3C illustrates the Algorithm for learning the streaming schedule.

FIG. 3D illustrates the Algorithm for streaming management schedule.

FIG. 3E illustrates the Algorithm for interactivity management.

FIG. 4A illustrates the Advertisement selection criteria.

FIG. 4B illustrates the Algorithm for computing purchase prediction for individual products.

FIG. 4C-1, and FIG. 4C-2 illustrate the Algorithm for computing purchase prediction for product groups.

FIG. 4D1-a and FIG. 4D1-b illustrate the Algorithm for purchase prediction computation (co-purchases).

FIG. 4D2-a and FIG. 4D2-b illustrate the Algorithm for purchase prediction computation (festivals).

FIG. 4D3-a and FIG. 4D3-b illustrate the Algorithm for purchase prediction computation (events).

FIG. 4E illustrates the Algorithm for advertisement selection for event/mall specific ad streaming.

FIG. 4F illustrates the flowchart for promotional offer validation and confirmation.

FIG. 4G illustrates the Algorithm for monthly billing computation for a subscriber.

FIG. 5A illustrates the Algorithm for deriving a weekly plan for streaming the ads in scheduled streaming mode.

FIG. 6A illustrates a typical representation of an advertisement.

FIG. 6B illustrates the aspects of Ad customization.

FIG. 7 illustrates PPAS client application architecture and screen illustrations.

FIG. 8A illustrates the scenario for scheduled streaming sequence.

FIG. 8B illustrates the scenario for subscriber initiated streaming.

FIG. 8C illustrates the scenario event specific promotional ad streaming.

FIG. 8D illustrates the scenario for Ad streaming to virtual communities—case of private movie screening.

DETAILED DESCRIPTION OF THE PREFERRED EMBODIMENT

In describing a preferred embodiment of the invention illustrated in the drawings, specific terminology will be used for the sake of clarity. However, the invention is not intended to be limited to the specific terms so selected, and it is to be understood that each specific term includes all technical equivalents, which operate in a similar manner to accomplish a similar purpose. With reference to the drawings, in general and FIGS. 1 through 8 in particular, the method and apparatus of the present invention is disclosed.

FIG. 1A-1 and FIG. 1A-2 shows the system and network architecture of PPAS. The system interacts with the following external entities:

PPAS client application: To facilitate configuration of a mobile terminal and to provide subscriber requested information.

Billing system: To provide subscribers related minutes of discount information to the 3G service providers.

Sponsor/content provider system: To receive the content and provide ad viewing statistics.

Mall/outlet systems: To receive promotional offers and provide offer utilization statistics.

At the heart of the system is purchase prediction based on past purchase data of the subscribers. The system learns and maintains the streaming schedule of the various subscribers so as to achieve the effective return on investment on ad streaming. The system also manages the location and event specific ad streaming, along with promotional offers, to help realize a good impact on the streamed advertisements. The system enforces an adequate security mechanism which is based on face recognition. The camera that is part of a 3G device is exploited to track the attention of the subscriber during the streaming.

FIG. 1B shows the system-subscriber interface in various contexts. As can be seen in this figure, subscriber is shown with a GPS enabled mobile device. GPS service provider (1001) supplies the location co-ordinates to Location decoder (1002), which converts the geographical location co-ordinates to a meaningful location information and passes on to Location relevance identifier (1003). This unit maintains the record of all the relevant information such as the location of shopping mall, specific product outlets, sales events etc. Upon receiving the location information from the location decoder (1002), Location relevance identifier (1003) identifies the list of malls, product outlets or events in the vicinity of the subscriber's locations and this information is passed on to Ad-selection unit (1006). The Subscriber interface manager (1009) receives subscriber identification and subscriber instructions. Subscriber interface manager (1009) manages the service levels and regulates the streaming services and accordingly, the manager, with an interface with subscriber information database (1011), handles all the subscriber instructions. Purchase predictor (1008) supplies the purchase prediction for the subscriber referred by the Subscriber interface manager (1009), to Ad selection unit (1006). Ad selection unit (1006) also receives current event information from Event data manager (1004) and Ad-characteristic data from Ad-characteristic database (1005). Ad selection unit (1006) selects an advertisement based on current location, event information and current purchase prediction, and supplies the selected ad to the Ad-Customization (1007), which in turn provides the customized content to the Streaming manager (1012).

FIG. 2A shows Subscriber Data-Entity Relation (2001) related to Subscriber information database. Subscriber information consists of the following:

Demographic Information: This consists of subscriber information such as age, occupation, region, education and family information. Source of this information is the voluntary submission by subscriber at the time of the subscription.

Subscription Information: This mainly consists of the service levels subscribed by the subscriber and this is initialized by the system at the time of registration and updated on need basis.

Preferred schedule information: When subscriber opts for scheduled streaming mode, she supplies her preferred schedule in terms of the days and time during which she would like to accept the advertisement streaming during a week. Also optionally the subscriber may specify the maximum number of advertisements she would like to receive in one session. The input format for this date is shown in FIG. 2B-1 (2002).

Preferred presentation aspects: Subscriber's preferences in terms of the presentation aspects including but not restricted to audio, visual, movie with animation or movie without animation, and musical content are acquired from the subscriber based on a questionnaire. This questionnaire is administered at the start of subscription and at regular intervals thereafter, to update the changes that may occur in the subscriber's preferences. Additionally, the subscriber may choose to give a specific feedback after every streaming session on the content streamed in that particular session. 2003 in FIG. 2B-2 shows the format for collection of presentation preferences. As shown in the table the music preference is represented by different types which have semantic hierarchical relation. This hierarchical relation is used in matching the Ad types with the nearest preferences of the subscriber. For example if a subscriber prefers Indian classical music and for a particular ad the nearest available variation is only an Indian folk musical then the same is selected for this subscriber. Similarly the background of the scenes is represented by a set of predefined and hierarchically related background types. In case of Background, semantic hierarchy will be used in selecting the background, which is nearest match to the subscriber's preferences for example if she likes sea shore as background when this is not available any background with a water body is selected. Yet another aspect of presentation is the color preference of the product object in the advertisement here for each product the sponsor specifies the possible colors and among these colors, one which matches the color preference of the subscriber for that product will be chosen. In case there is no match found between these two then the default color as specified by the sponsor would be used.

Learning of presentation aspects, FIG. 2E illustrates the sequence of steps in the learning of subscriber preferences. In this figure the sequence is shown for Music type and Product color. As part of learning, different samples representing different music types are presented to the subscriber for his preference rating (2502). These ratings are validated by normalizing the values such that most preferred type will get a rating of one and not preferred type as zero (2504). These validated ratings are updated to the database (2505). Similar sequences of steps (2506) to (2512) are shown for learning the product color preference of the subscriber. In case of product color the learning for a product is extended to other products which are hierarchically related to the product. For example, the color preferred for shoe is extended to waist belt.

Historical purchase data: This is the purchase data of the subscriber, which is collected from various purchases made, by the subscriber in the past. This data is collected directly from the participating member organizations based on the concurrence of the subscriber.

Terminal device Information: This is the information of the devices on which the subscriber would like to receive the advertisements. Subscriber may specify more than one device and may also associate each device with a schedule in which case this information is also stored along with device type information.

FIG. 2C illustrates the management of advertisement characteristic information (2004). The sponsor or the content provider for each of the advertisement supplies this information. This consists of:

Product or service information consisting of description of a product or service, intended target consumers, available variations in the product etc.

Location Relevance of a product or service consists of defining the importance of the product with any specific location if any.

Event relevance of the product or service if any. For example, if a product is related to sports then it will have relevance with any sports event which is envisaged in the near future.

Ad-meta data consisting of description of the advertisement in terms of description of visuals, description of scenes or personalities pictured, language information, description of musical contents etc.

FIG. 2D illustrates the management of advertisement collection (2005). This consists of product advertisements, promotional offers, malls/events advertisements, Brand Promotions.

FIG. 3A illustrates the details of various service levels offered by the system in this embodiment. As shown in the figure Service level Mode-1 (3101) comprises of the streaming service as purchase counseling in which advertisements are streamed in response to a subscriber's query. Typically to access this service, subscriber selects this service option through the configuration menu of her device. System guides the subscriber through a set of instruction in which he is asked to give details on the product or service he would like to have information on. System then selects all the relevant advertisements and streams them to the subscriber in sequence, in the order of decreasing relevance.

Mode-2 shown in the same figure (3104) is a service level, which offers Ad streaming service to individual subscribers. This comprises of 5 optional modes of services; customization of the audiovisual aspects of the selected advertisement to suite the subscriber's preferences is the common feature in all these modes (3106).

Mode-3 shown in the same figure (3110), is a service level, which offers Ad streaming to virtual communities. These communities can be a group of people who are participating in a private screening of a movie or two or more groups participating in a videoconference. In the figure, these are respectively referred as Mode-3 A (3111) and Mode-3B (3112).

FIG. 3B illustrates the scheme of Mode-2 Service level. As shown in the figure, this service level comprises of optional mode Mode-2A as Scheduled streaming (3201). In this mode, the advertisement is streamed in accordance with a schedule, which is either subscriber-specified (3203) or a learned schedule (3202). When the subscriber does not supply the system with a preferred schedule, she is offered with suitable time slots during which she will be receiving the ad streaming. These time slots are assigned to the subscriber based on his demographic characteristics. The details for deriving these suitable time slots are described below as illustrated in FIG. 3C.

1. As an offline activity each of the subscriber is classified, based on her demographic characteristics, into one of the categories such as: (3301)

Students
Professionals
Businessmen
Housewives

2. An offline survey is conducted for each of this category to collect the preferred time slot for ad streaming. In this survey, each subject in a category shall provide with one or more time slots during which she would prefer to accept the ad streaming. Table-1 below shows the raw data collected in such a survey for a category. (3302)

TABLE 1

Raw data from survey

| Subscriber ID | Preferred Time Slot |
| --- | --- |
| $SC_1$ | 6:00 To 7:00 AM |
| $SC_2$ | 9:00 To 10:00 AM |
| $SC_2$ | 2:00 To 5:00 PM |
| $SC_3$ | 10:00 To 12:00 AM |
| $SC_4$ | 8:00 To 10:00 AM |
| $SC_4$ | 4:00 To 7:00 PM |

3. This raw data is analyzed to get the number of subjects who preferred a particular time slot. This is computed for each half hour interval, for example, the number of subjects who prefer streaming between 6:00 and 6:30 AM and so on. This data when plotted against the number of subjects preferring a particular time slot shows one or more peaks. The half hour time slots corresponding to these peak values are identified as prime time slots for this category. This is repeated for all categories. (3302)
4. At the start of schedule learning, each subscriber is assigned with the prime time slot identified for the category she belongs to. And further learning of the preferred schedule within this time slot is carried as per the steps shown below. (3303)
5. This learning is carried out for each individual subscriber. Each of the assigned time slots is divided into sessions of half hour each and the set {S1, S2, . . . , Sk} represents the sessions associated with the category under consideration. The subscribers belonging to this category are equally distributed across these sessions. For example, if there are 2000 subscribers in a category with 4 sessions {S1, S2, S3, S4}, then each session is associated with 500 distinct subscribers.
6. During the selected session, streaming is attempted. In case of streaming being barred by the subscriber, next session is selected and streaming attempted again. This is repeated for each session. (3304)
7. For a session, the accepted number of streams are accumulated to determine the suitability of the session for the subscriber.
8. Of all the sessions associated with a subscriber, the session with highest weight is selected as the preferred session for this subscriber.
9. The above procedure is carried out separately for weekdays and weekends to get separate preferred sessions for weekdays and weekends.
10. Above steps are repeated for each subscriber. (3305)

To facilitate uniform distribution of load on the advertising system, proper incentive scheme is required to encourage the subscriber to use the system in non prime-time slots. In this embodiment one such scheme is proposed. Based on sample survey, the proportion of each category is obtained. Considering the total streaming time available for the system as 18 hours per day, for each category the stream time per day is distributed in the above proportion. The time slots associated with each category is expanded or shrunk in such a way so as to account for the streaming times associated with each category. Also, it is ensured that the time slots of different categories do not overlap.

In Subscriber initiated streaming (3206) (Mode 2B), the advertisement is streamed when ever the subscriber is ready to accept the same. Willingness to accept an advertisement is conveyed to the system by the subscriber through the configuration management functionality of PPAS client application. This action enables an appropriate flag indicating the status that the subscriber is ready to accept the advertisements. During the streaming session, a subscriber may interact with the system through menu options and perform transactions such as online purchase, acceptance or rejection of specific offers and request for additional information.

In Promotional alert streaming (3207) (Mode-2C), the streaming of the advertisement is effected when one or more of the following criteria are met:
  When there is purchase prediction available for a product and there is a sponsored advertisement available for that product with the system.
  When the subscriber's current location matches with location relevance of any of the products.

In this level of service, the locational advantages are exploited to achieve maximum benefit from the target advertisement. For example, a sponsor may specify that his advertisement should be streamed to subscribers during their travel through a particular street. In which case, when system receives the information indicating that a particular subscriber has entered a particular identified street, system checks the streaming enabled status for the subscriber and if it is enabled then the selected advertisement is streamed. In selecting the advertisement, the system also takes the purchase predictions for the subscriber into consideration.

Yet another service level is available for the subscriber as Promotional alert (SMS-/MMS-/VMS-mode) (3208) (Mode-2D). In this service level, the subscriber chooses to receive Promotional alerts as alert messages by enabling appropriate status flag and selecting the mode (SMS-/MMS-/VMS) in which she would like to receive the alert through the configuration management functionality of PPAS client application.

In this embodiment another variation of advertisement streaming is offered as service level Mode-2 E (Real time streaming 3209). In this mode, advertisements with video and caption and without audio are streamed to the subscriber during a call. This service level is restricted to the terminals, which have 3G capabilities, and device display is viewable during the conversation (such as in a hands free situation). Subscriber is provided with an option to terminate this streaming any time he wishes to do so through the configuration management functionality of PPAS client application. Additionally, advertisements are streamed immediately after the termination of a voice call this real time streaming helps in capturing the attention of the subscriber when she is still focused on the device.

FIG. 3D Illustrates algorithm for streaming management comprising of following steps:
  1. Determine the next half-hour session for streaming. (3502)
  2. Determine all the subscribers whose schedule matches with this session or who have enabled their devices for streaming. (3503)
  3. Select a subscriber. (3504)
  4. Check if this subscriber quota of streaming is fulfilled, if yes, select next subscriber, else continue.
  5. Select an ad from the set of ads pre-selected for this subscriber. (3505)
  6. Stream the selected Ad (3506), during the streaming the face image of the subscriber is received from the PPAS client system (3507) and is analyzed to asses the attention of the subscriber on the ad being streamed and after completion of streaming, repeat the step 4 through 6.

FIG. 3E illustrates voice based interactive advertisement service. In this service, subscriber is provided with voice interactivity with advertising system during the streaming of the advertisement. User-friendly interactivity is provided to the subscriber by making use of:

Interaction by voice, subscriber can ask for additional information by verbal query. The voice messages so received by the advertisement system are analyzed for semantic contents by the voice analysis sub-system. Based on the semantic contents, the system directs the messages to appropriate sub-systems. For example if the subscriber queries for additional information on the product featured in the advertisement, PPAS analyses the query and directs it to the appropriate call center maintained by the sponsor of the featured advertisement. Additionally, the system provides the call center with identification of the advertisement so that the call center can view the same visual as seen by the subscriber and understand his query correctly. The call center operator provides subscriber with relevant answers for his query through a voice line.

Touch sensitivity of the Display, through which the subscriber can select specific parts of the advertisement display for interacting with the system. This information is received and analyzed by the ad system and if appropriate is conveyed to the call center for response. For example, a subscriber touches an icon on the screen indicating list of outlets for this product, then the ad system analysis this query and directs it to appropriate call center which responds either with a voice response or send a visual containing the requested information.

Gestures: The images received from the subscriber's 3-G camera are analyzed by the system, for her gestures and these are used for following:
Authentication of the subscriber identity
And tracking the attention of the subscriber towards the advertisement.

The former information can be used to ensure that subscriber privacy is protected and to avoid any possible incorrect targeting of advertisement. The latter information can be used for incentive calculations.

FIG. 4A illustrates the criterion for advertisement selection. As shown in the figure the criterion for Ad selection is three fold, one based on the purchase prediction (4101) for a product by a subscriber, two, based on the locational relevance (4103) of the product or the offer, third, event relevance (4104). These are explained below:

Purchase prediction: The probability that a subscriber will purchase a particular product in a particular week is referred as purchase prediction. This prediction for each subscriber is estimated based on a prediction model derived for each individual from historical data of his previous purchases. This prediction is estimated at two levels, in first level the raw prediction of the purchase is estimated based on the time series analysis of the historical purchase. This estimate would give the probability of purchase of a product in any week. However, this is referred as raw since it does not consider the effect of other factors such as the influence of other co-purchases and ongoing events on the purchase of a product. Further, a set of product hierarchies is derived based on the semantic relations between the products. These hierarchical relations facilitate in extrapolation of the purchase predictions of one product to other products.

Algorithm for Computation of first level purchase prediction for individual products for a subscriber is illustrated in FIG. 4B as explained below:

For each product P the historical data consists of the time stamped purchase event and number of units purchased.
1. Compute the series of temporal separation of purchases from the above data. ($G_1, G_2, \ldots G_N$). (4201)
2. Purchase of multiple units of a product in a single purchase event is likely to affect the subsequent purchases of the same product. To take this into account, normalize the temporal separation of two successive events with the corresponding number of units purchased in the earlier event. Derive a series of normalized temporal separations ($G^N_1, G^N_2 \ldots G^N_N$). (4202)
3. Compute the moving average for n−1 terms of the above series as $M_{n-1}$. (4203)
4. Compute the variance $\epsilon_{n-1}$ as $\epsilon_{n-1} = M_{n-1} - G^N_{n-1}$. (4204)
5. Purchase prediction for this product consists of computing the possible week for the next purchase (n+1$^{th}$ purchase) given previous n normalized temporal separations. (4204) n+1$^{th}$ temporal separation $G^N_{n+1}$ is computed as:

$$G^N_{n+1} = M_n + (\epsilon_{n-1}*\phi_1 + \epsilon_{n-2}*\phi_2 + \ldots \epsilon_{n-k}*\phi_k)$$

Where k and $\phi_1 \ldots \phi_k$ are configurable parameters.
6. The possible week $W_{n+1}$ for n+1$^{th}$ purchase is predicted as $W_{n+1} = W_n + G^N_{n+1}$ In the next stage of computation the probability of purchases being made in the above computed week is estimated.
7. From the historical data the probability P(N) in terms of number of likely purchases (N) of a product in a year are computed. (4205)
P(N) is computed as follows:

$$P(N) = R/Q;$$

Where R is the number of years in which the number of purchases of product P are greater than N, and Q is the total number of years for which the data is available.
8. By extending the prediction computations of step 6 to predict all possible purchases for a year, the number (m) of purchases in a year are computed. For each of these purchases, purchase probabilities as computed in step 7 are assigned. (4206)
9. In case the number of purchase computed in step 8 are larger than the maximum number of purchase N for which the probabilities are available from step 7 then the all the purchase for which the probabilities are not available are equated to the least probability value computed in step 7. (4207)

Predictions for products are done based on a predetermined product hierarchy. FIG. 4C illustrates an algorithm for computing purchase predictions for product groups and FIG. 4C-2 illustrates a typical product hierarchy (4407).

The second level of estimation is based on a Bayesian network model representing the influence of other co-purchases and ongoing events on the purchase of a product. As shown in the figure the purchase prediction is based on learning of the purchase pattern of a product from the historical data.

FIG. 4D1-*a* and FIG. 4D-1-*b* illustrate the scheme for the Bayesian network model for the prediction of event-influenced purchases and algorithm for deriving these models. This model consists of directed graphs for each of the products, where the central node represents the purchase being influenced and all other nodes represent the events, festivals or other purchases influencing the central node. The node strengths represent the individual probability of occurrence of the nodes and the edge strength represents the conditional probability of occurrence of the central node with respect to the corresponding connecting node. In this embodiment the following influences on a purchase are considered:
1. Association between purchase of two different products. The influence of co-purchased on a product (P) is considered to be independent of the influence of the product (P) on co-purchase of any other products.
2. Influence of festivals.

3. Influence of a promotional event such as an industrial fair, sales exhibition.

These directed graphs are derived from historical purchase data of each individual subscriber. The algorithm for computing the link probabilities for the edges in this graph for each product purchase, for the case of co-purchase is as follows:

1. Read in historical purchase data (4400).
2. Generate a list $L_{main}$ of all products purchased (4401).
3. Select a product P from the list (4402).
4. Compute the total number of purchase (N) of product P in the data (4403).
5. Generate a list ($L_p$) of all products $\{p_1 \ldots p_i\}$ which were purchased in the week preceding each of the purchases of product P (4404).
6. Select one product ($p_i$) from the above list and compute the total number of purchases (n) of this product within the week preceding any purchase of P (4405).
7. Compute the link probability of link $p_i$ and P as $p(P|p_i) = n/N$ (4406).
8. Repeat the steps 5 through 7 for all the products in the list $L_p$ (4407).
9. Repeat steps 3 through 8 for all products in the list $L_{main}$ (4408).

In the case of the festivals (FIG. 4D2-$a$ and FIG. 4D2-$b$) the above steps remain the same except for the link probability is computed as: $p(P/f_1)=n_f/N_f$
where $n_e$ is number of occasions of festival ($f_i$) the week within which the purchase P is made and $N_f$ is total number of occasions of festival ($f_i$) in the data.

Similarly in case of events (FIG. 4D3-$a$ and FIG. 4D3-$b$), the link probability is computer as: $p(P/e_i)=n_e/N_e$ wherein $n_e$ is number of occasions of events ($e_i$) the subscriber was aware of before which the purchase P is made and $N_e$ is total number of occasions of event ($e_i$) in the data.

The algorithm for computing the combined purchase probability for a product under the influence of other events is as follows:

$$p1 = P(x_1) \text{ Node strength}$$

$$p2 = (1-p1)P(x_2)p(x_1/x_2)$$

$$p3 = (1-p1-p2)P(x_3)p(x_1/x_3)$$

$$pn = (1-p1-p2\ldots-pn)P(xn)p(x_1/xn)$$

Combined purchase probability is given by $P_p = \Sigma p1 + p2 + \ldots pn$

Event and location related relevance estimation: The subscriber location information is used in selecting the advertisement to be streamed to the subscriber. However, the usage of this information is different in different scenarios. Three algorithms specific to this embodiment are explained below:

Algorithm for event related ad selection (Subscriber located in the vicinity of an event):

This refers to a scenario when it is detected that the subscriber is in the vicinity of one or more events. Events refer to exhibitions or festivals organized for promoting sales of products or services. The objective for the advertisement system is two folds one to attract the subscriber to a relevant event, which is close to him, and second to draw his attention to a product which has largest purchase prediction for him. Overall goal, however, is to achieve product purchases from the subscriber. In this embodiment the following types of advertisements are considered:

1. Advertisement to promote the event itself which typically sponsored by the event organizers.
2. Promotional offers specific to an event. For example a company X may offer a fixed free air time for every promotional message they accept during their presence in the event venue or in a specific stall in the event venue. These promotional messages can be related to product or service or Brand promotional advertisements. Alternatively the massage could be a short voice message or textual caption indicating that the first n minutes of the call is sponsored by the sponsor, in which case subscriber is not offered with any other advertisement view.
3. Advertisements of specific outlets in the event.

The advertisement streamed to the subscriber is a combination of all the above advertisements, each of which is selected separately for a subscriber, based on her profile. FIG. 4E illustrates the algorithm for selection of ads when the subscriber is in the vicinity of events. As can be seen from the figure the first step is to select the event based on the proximity and then based on the product prediction. The proximity is computed by using the location co-ordinates of the event and those of the subscriber. Once the location receiver receives the location co-ordinates of the subscriber, it compares these co-ordinates with individual co-ordinates of various current events and selects the event or events, which are in close proximity of the subscriber. Typically it selects one or more events which are closer than by a specified distance. This specified distance is configurable and can be configured by the system administrator. When there are more than one event, which is in the proximity of subscriber, then further selection is based on the target factor computed for each event. Further to this, the advertisement of the product which has largest purchase prediction for the subscriber is selected and this is merged with advertisement of the event selected in the last step and streamed to the subscriber. This streaming is repeated until the subscriber either enters one of the events or moves away from all the events. Once the subscriber enters one of the events, then further streaming is as shown in the FIG. 4E. Subscriber has an option to stop this service temporarily as along as she wishes to do so.

1. The location co-ordinates of the subscriber are acquired by the system every 15 minutes (4501). While the service status flag is ON, below steps are executed.
2. From the list of events select all those events such that the distance $D_{Ei}$ between the subscriber and the event is not more than the effective radius $R_{Ei}$ defined for that event (4502).
3. Sort these selected events into two groups, one ($G_1$) with those events whose $D_{Ei}$ less than a predefined threshold $R_T$ and the second ($G_2$) with events whose $D_{Ei}$ is more than $R_T$. The first group represents those events, which are in a close reach of the subscriber, and second group represents those which are not in the immediate vicinity but events themselves have larger effective radius (4502).
4. Compute the "Target factor" for each of the above events (4502) as defined below $$Ti = [(Ei \cdot P)/|P|]/D_{Ei}$$

Where $E_i = \{P_1, P_2, \ldots P_n\}$ and $P = \{(P_1, p_1), (P_2, p_2), \ldots (P_m, p_m)\}$
$P_i$, is the product with a purchase prediction of $p_i$.
5. Generate an ordered list of events $\{(E_1, T_1), (E_2, T_2) \ldots (E_i, T_i)\}$ (4502)
6. Select the event $E_m$ with largest target factor. (4502)
7. Check weather this event was selected in immediately previous cycle if yes go to step-9. (4502) If not continue.
8. Select the ad of the product with largest purchase prediction for this subscriber from the products associated with the selected event (4503)

9. Select the ad of the product with purchase prediction next to that of the product selected in immediately previous cycle (4503).
10. Merge the event and product ad selected above (4503).
11. If the event selected belonged to G1 wait for 30 min else wait for 24 hr.
12. Read the location co-ordinates of the subscriber.
13. If the subscriber is inside any event continue, else go to step-2.
14. Select appropriate promotional offer (Type-1) for the event entered by the subscriber. These Type-1 ads are promotional offers specific to an event and are sponsored by corporate for promoting the brand. Further the sponsor may impose a restriction on number of such offers and therefore it is required to select subscribers based on appropriate criteria. In selecting subscriber the systems uses a selection criterion consisting of:

Demographic Information of the subscriber.

Previous history of the subscriber with respect to similar offers in the past. (This is a ratio of number of times accepted to number of times offered).

Details of the last accepted offer. (For example sponsor may not want to offer consecutively twice to the same subscriber. Or sponsor may want to offer to all those who accepted his competitor's offer last time.)

15. After completion of streaming wait for 30 min.
16. Read the location co-ordinates of the subscriber.
17. Is subscriber moved away from all the events listed then stop, else continue.
18. If the subscriber is inside the same event continue else go to step-2.
19. Select product with next largest purchase prediction from product list of the current event. (4503)
20. Select ad for the above product (4503).
21. If any product specific offer is available for this product then go to step 22 else stream product ad only. (4506)
22. Merge product ad with suitable offer and stream (4506)
23. After completion of streaming wait for 30 min.
24. Read the location co-ordinates of the subscriber.
25. Is subscriber moved away from all the events listed then stop, else continue.
26. If the subscriber is inside the same event continue else go to step-2.
27. Select product with next largest purchase prediction from product list of the current event. (4503) and repeat step 19 to 27 until all the products in the list are covered.
28. If there are no products to select continue else repeat step-27.
29. Read the location co-ordinates of the subscriber.
30. Is subscriber moved away from all the events listed then wait for 15 min and go to step-1, else continue,
31. If the subscriber is inside the same event continue else go to step-2.
32. Compare with locations of the outlets in the event and select the nearest outlet to the subscriber.
33. Stream the advertisement of the selected outlet and wait for 30 min after streaming (4506).
34. Repeat steps 29 to 31 till all the outlets are covered.

The streaming of ads and promotional offers related to malls/outlets is similar to procedure outlined above.

Case of Subscriber Traveling Through a Specific Street:

The promotional offers mentioned above can have variations in terms of the sponsor specification. This variation of the offer could be that the sponsor specifies that an offer of free airtime be made to subscriber's traveling through a specific street. (This street could be where the sponsor's corporate headquarters are located). In which case the first criteria for selecting the subscriber is his location and further selection depends on the above mentioned criteria.

FIG. 4F illustrates the sequence of managing the product specific offers with following steps 1. In case the subscriber chooses to transact online, she avails the offer benefits immediately; the offer related information is updated; stop.
2. Generate unique offer ID indicating the validity, subscriber ID (4701)
3. Subscriber presents the Offer ID to the outlet (4702)
4. Outlet provides the offer ID to the advertisement system for verification along with the subscriber credit card information (4703)
5. System checks for the validity of the offer and authenticity of the subscribers credentials (4704)
6. Is the transaction approved by the System if yes go to step 6 else go to step 7,
7. Outlet offers the promised incentives to subscriber (4705),
8. Outlet rejects the offer with valid reasons (4706), FIG. 4G illustrates algorithm for monthly billing computations for a subscriber with billing system in case of ad streaming. Incentives offered to the subscriber for viewing the advertisement are in terms of reward points. Reward points are specified for each advertisement by the sponsor. Each time when a subscriber views an ad, specified reward points are credited to the subscriber's account. These reward points are accumulated for a month (4801) and are converted to minutes of discount on monthly basis by applying subscriber specific rules (4803). These rules are based on the subscriber specific service levels (4802). The service provider of this subscriber is provided with information of total minutes of discount computation for affecting the monthly billing of his services.

FIG. 5A illustrates the algorithm for generating a weekly plan of streaming to a subscriber. Weekly plan of streaming to a subscriber is based on two main aspects: one, the requirements of the sponsor for each advertisement which will determine the number of streaming required for each advertisement, and second, the limits set by the subscriber to receive the advertisements both in terms of schedule and number of advertisements she is willing to accept. This plan is derived taking the following into consideration:

1. The number, Nai, of streaming sessions per week specified by the sponsor for an Ad.
2. Number of repeat streamings allowed per subscriber for an Ad, as specified by the sponsor.
3. Number of streamings required to be streamed weekly to the subscriber.
4. Minimum threshold purchase probability required for streaming, as specified by the sponsor.

The steps of the algorithm illustrated in FIG. 5A are explained below:

1. Select a subscriber set; N as equal to weekly quota. (5100)
2. Get the predicted product list P={P1 ... PN} for this subscriber (5101)
3. Get the list of advertisements and corresponding streaming information A={A1 ... Am} (5102)
4. Group the advertisements Product wise Gpi
5. Compute for each group, npi as sum of all Nai of each advertisement in the group as number of streams allowable in the group (5103)
6. Process the product list (L1) to select the products P1 to Pm with purchase prediction equal to or greater than average threshold (5105).

7. Identify the groups associated with the products in list L1 and compute the sum (Ng) of npi for these groups (5106).
8. If Ng is equal to N then continue, If Ng is less than N then go to step 5111 else go to step 5112.
9. Assign the List L1 along with groups identified in 5106 to this subscriber (5107).
10. Check if there are more subscribers if yes repeat steps 5100 through 5107 else continue.
11. Select product Pm+1 with purchase prediction less than Pm and include to list L1 and go to step 5107 (5111).
12. Drop the product with least prediction and recalculate ng such that ng becomes equal to N (5112).

FIG. 6-A illustrates the presentation aspects of the advertisements. Customization of audio-visual aspects is achieved by manipulation of specific objects in terms of their attributes to suite the preference of the subscriber.

For an advertisement, sponsor provides multiple variations for each object. For example, the background may have more than one possible variation such as a clear sky or a blue sea or urban surroundings: each variation defined as an object with different possible attribute values. Similarly in case of audio, different variations in terms of language are provided as different objects. Depending on the subscriber preference appropriate object variation is selected for customizing the advertisement. In case of objects representing specific products such as a shoe or shirt on human characters the customization is achieved by manipulating specific attributes such as type or color as applicable. FIG. 6B illustrates the sequence of ad customization.

FIG. 7A and FIG. 7B illustrate the screen illustrations and architecture for the client application of PPAS. Client application consists of the following modules:

Security management: This module performs the function of first level authentication. It analyzes the images from the camera of the 3G terminal and sends this information to PPAS server for authentication. Once authenticated by the server it uses this information for periodic authentication at client level.

Streaming management: This module manages the subscriber interactivity with system during the streaming of the advertisements. This interactivity could be in terms of requests for additional information, online purchases or request for repeat streaming.

Configuration management: This module manages the configuration aspects which control the streaming to the device. The screen shown in the figure illustrates the configuration parameters that can be modified by the subscriber through the terminal device.

View information: This manages the streaming and related incentive information of the subscriber. The screen shown in the figure illustrates the information available for the viewing of the subscriber.

Communication management: This manages the communication with the PPAS server.

FIG. 8A illustrates the sequence of steps in the scheduled streaming of advertisements to the subscriber which consist of selection of subscriber whose schedule matches and selection of appropriate advertisement to stream to the selected subscriber.

FIG. 8B illustrates the sequence of steps in subscriber initiated Streaming to a mobile phone, which takes the subscriber location in to consideration in selecting a suitable advertisement to stream.

FIG. 8C illustrates the sequence for event specific streaming of promotional offers.

FIG. 8D illustrates Advertisements streaming sequence to a virtual community. In this illustration the objective is to stream one or more advertisements that are relevant to a community. As shown in the figure, the theater is capable of receiving advertisement from PPAS system. The PPAS system analyzes the community of the viewers in the theater to select the best possible advertisements. Based on the analysis the community of the viewers is grouped in one or more groups with members of each group exhibiting a similar profile characteristics. PPAS system ensures that equal priority is given to each one of these groups. The timings for streaming the ads is as per the profile of the virtual community.

Similarly, in the case of video conferencing the participants are analyzed and grouped. Depending on the nature of the video conference (for official discussions or for chat purposes), the system selects a set of appropriate advertisements (either product related or event related) and streams them during pre-agreed break times.

Thus, a system for selecting, customizing and streaming promotional advertisements of products and services to 3G capable terminals of specific individuals based on their profiles has been disclosed. Although the present invention has been described particularly with reference to the figures, it will be apparent to one of the ordinary skill in the art that the present invention may appear in any number of systems that select, customize and stream multimedia based on an individual profile of a recipient. It is further contemplated that many changes and modifications may be made by one of ordinary skill in the art without departing from the spirit and scope of the present invention.

What is claimed:

1. A system for selecting, customizing and streaming a plurality of promotional advertisements of a plurality of products supported by a plurality of sponsors to a plurality of 3G capable terminals of a plurality of subscribers of said system satisfying a plurality of sponsor requirements of said plurality of sponsors and based on a plurality of past purchases of said plurality of subscribers, a plurality of events, a plurality of malls, a plurality of festivals, and a plurality of planned streamings, involving streaming of a plurality of customized advertisements related to said plurality of promotional advertisements to a subscriber of said plurality of subscribers and to a plurality of grouped subscribers of said plurality of subscribers, said system comprising:

means for obtaining said subscriber of said plurality of subscribers;

means for predicting a plurality of predicted products of said subscriber based on a plurality of subscriber specific past purchases associated with said subscriber, wherein said plurality of subscriber specific past purchases is a part of said plurality of past purchases and said means further comprises means for obtaining a plurality of product hierarchical relations associated with said plurality of products, means for computing a plurality of product purchase predictions based on said plurality of hierarchical relations and said plurality of subscriber specific past purchases, and means for determining a predicted product of said plurality of predicted products based on said plurality of product purchase predictions and a predefined threshold;

means for predicting said plurality of predicted products based on said plurality of predicted products and a plurality of co-purchases associated with said plurality of subscriber specific past purchases;

means for predicting said plurality of predicted products based on said plurality of predicted products, said plurality of events, and a plurality of influence values, wherein said means further comprises means for computing said plurality of influence values based on said plurality of subscriber specific past purchases and a plurality of event specific products associated with an event of said plurality of events, wherein an event specific product of said plurality of event specific products is a part of said plurality of products;

means for predicting said plurality of predicted products based on said plurality of predicted products, said plurality of festivals, and a plurality of influence values, wherein said means further comprises means for computing said plurality of influence values based on said plurality of subscriber specific past purchases and a plurality of festival specific products associated with a festival of said plurality of festivals, wherein a festival specific product of said plurality of festival specific products is a part of said plurality of products;

means for predicting said plurality of predicted products based on said plurality of predicted products, said plurality of malls, and a plurality of influence values, wherein said means further comprises means for computing of said plurality of influence values based on said plurality of subscriber specific past purchases and a plurality of mall specific products associated with a mall of said plurality of malls, wherein a mall specific product of said plurality of mall specific products is a part of said plurality of products;

means for selecting a plurality of selected advertisements of said plurality of promotional advertisements based on said plurality of predicted products;

means for selecting said plurality of selected advertisements based on a plurality of grouped subscribers, wherein each of said plurality of grouped subscribers is a subscriber of said plurality of subscribers and is a part of a private group participating in a movie viewing or is part of a group involved in a video conference;

means for customizing said plurality of selected advertisements based on said subscriber resulting in a plurality of customized advertisements, wherein said means for customizing further comprises means for obtaining an advertisement of said plurality of selected advertisements, means for determining a human character present in said advertisement, means for changing an attribute of an object of said human character wherein said object comprises a shirt, shoe, and belt resulting in a customized advertisement, and means for making said customized advertisement a part of said plurality of customized advertisements; means for changing a property of an audio content associated with said customized advertisement wherein said property comprises type, language, voice, and instrumental, and means for changing a property of a background of said customized advertisement wherein said property comprises of type, color, shape, and size;

means for scheduling said plurality of customized advertisements with respect to said subscriber resulting in a plurality of subscriber specific planned streamings, wherein each of said plurality of subscriber specific planned streamings is a part of said plurality of planned streamings, each of said plurality of subscriber specific planned streamings is associated with a customized advertisement of said plurality of customized advertisements, and said means further comprises means for obtaining a sponsor of said plurality of sponsors, means for obtaining a sponsor requirement associated with said sponsor, wherein said sponsor requirement is a part of said plurality of sponsor requirements, means for obtaining an advertisement of said plurality of customized advertisements, means for determining a number of streaming sessions based on said sponsor requirements, means for determining of a number of repeat streamings allowed for said subscriber based on said sponsor requirement, means for determining of a number of required streamings based on said subscriber, and means for weekly planning based on said number of streaming sessions, said number of repeat streamings allowed, and said number of required streamings resulting in said plurality of subscriber specific planned streamings; and means for streaming an advertisement of said plurality of customized advertisements to said subscriber as per said plurality of subscriber specific planned streamings, wherein said means further comprises means for real time streaming of a video portion of said advertisement along with captions during a voice call of said subscriber and means for streaming said advertisement to said plurality of grouped subscribers.

* * * * *